(12) United States Patent
McHugh et al.

(10) Patent No.: US 8,478,672 B2
(45) Date of Patent: Jul. 2, 2013

(54) SYSTEMS AND METHODS FOR FACILITATING THE REPORTING OF AN INJURY CLAIM TO AN INSURANCE COMPANY

(75) Inventors: Robert McHugh, Saugus, MA (US);
Keefe Kirshen, Glastonbury, CT (US);
Carol Swirsky, Branford, CT (US)

(73) Assignee: The Travelers Indemnity Company, Hartford, CT (US)

( * ) Notice: Subject to any disclaimer, the term of this patent is extended or adjusted under 35 U.S.C. 154(b) by 65 days.

(21) Appl. No.: 12/949,511

(22) Filed: Nov. 18, 2010

(65) Prior Publication Data

US 2012/0130751 A1 May 24, 2012

(51) Int. Cl.
*G06Q 40/00* (2006.01)
(52) U.S. Cl.
USPC ................................. 705/35; 705/4
(58) Field of Classification Search
USPC .................................. 705/4, 35–40
See application file for complete search history.

(56) References Cited

U.S. PATENT DOCUMENTS 7,363,240 B1   4/2008 Armentano
8,010,391 B2 * 8/2011 Wait et al. .......................... 705/4

OTHER PUBLICATIONS

The Wall Street Journal, Personal Journal, The Doctor Will Text You Now, by Anna Wilde Mathews, Tuesday, Jun. 30, 2009.

* cited by examiner

*Primary Examiner* — Thu Thao Havan
(74) *Attorney, Agent, or Firm* — Fincham Downs, LLC.; Magdalena M. Fincham

(57) ABSTRACT

In accordance with one or more embodiments, a method of operating an insurance claim management system provides for receiving, in a claim reporting system, information related to a report of a injury claim, the information being provided by an insurance medical liaison located at a location at which the injured worker's injury has been evaluated. The information may also be indicative of an evaluation, by the insurance medical liaison, of at least one of a work-related injury and an injured worker. The method further provides for establishing a record in the claim reporting system for the claim based at least in part on the information received from the insurance medical liaison.

32 Claims, 14 Drawing Sheets

| | CLAIM NUMBER 305 | STATUS 310 | DATE REPORTED 315 | WHO REPORTED 320 | DATE OF INJURY 325 | DOCTOR'S FIRST REPORT? 330 | COMPENS. DET. BEGAN 335 |
|---|---|---|---|---|---|---|---|
| R300-1 → | WC-1703-21 | OPEN | 02/12/04 | NURSE | 02/12/04 | 02/27/04 | 02/13/04 |
| R300-2 → | WC-1980-43 | OPEN | 01/21/06 | EMPLOYER | 10/25/05 | 11/15/05 | 01/22/06 |
| R300-3 → | WC-2239-04 | OPEN | 09/07/07 | NURSE | 09/06/07 | 09/17/07 | 09/07/07 |

FIG. 3

700 → Initial Contact Screen

XYZ Insurance Corp.

CLAIM NUMBER: XX-111     CLAIMANT NAME: C & C, Co.     STATE: NJ
DATE OF LOSS: 07/22/2009     STATUS: OPEN

Introduction
EMPLOYEE CONTACT INFORMATION:

Mary Smith
100 Main Street
Big City, USA  55555
Home phone: 111-222-3333

☒ Explained My Role

Injury Information
DESCRIPTION OF INJURY:

Sprain of the neck while carrying 20-30-lb. packages down stairs of building. IW felt pain in neck and upper back.

| | | |
|---|---|---|
| BODY PART INJURED: | Neck and Upper Back Area | Change |
| TYPE OF INJURY: | Sprain | Change |
| CAUSE OF INJURY | Carrying | Change |

OBSERVATIONS/DETAILS:

IW appears in pain, has trouble turning neck to see behind her; appears distraught at how long pain has lasted. Did not seek treatment for several weeks because thought pain would go away.

[Complete] [Preview] [Attempted] [N/A] [Pend]

Report Summary Screen

XYZ Insurance Corp.

Claim Summary Information

| | |
|---|---|
| CLAIM NUMBER: | XX-111 |
| DATE OF REPORT: | 01/15/2008 |
| TIME OF REPORT: | 02:34 PM EST |
| ADJUSTING OFFICE: | 09531 |

Caller Information

| | |
|---|---|
| FIRST REPORT TAKEN VIA: | Telephone |
| CALLER PHONE NUMBER: | 333-444-5555 |
| CALLER TYPE: | Nurse |
| CALLER NAME: | Joe Black |
| CALLER TITLE: | Nurse |
| CALLER E-MAIL: | jblack@xxx.com |

Initial Contact Information

| | |
|---|---|
| DATE OF INITIAL CONTACT: | 01/15/2008 |
| WHO MADE INITIAL CONTACT: | Nurse |
| INITIAL CONTACT MADE WITH: | Injured Worker |

FIG. 8

SYSTEMS AND METHODS FOR FACILITATING THE REPORTING OF AN INJURY CLAIM TO AN INSURANCE COMPANY

BACKGROUND

Insurance companies receive reports of claims relating to injuries (e.g., bodily injuries, psychological injuries, emotional injuries or other types of injuries), submitted for payment based on adverse occurrences believed to be covered under a policy carried by the insurance company. Workers compensation (WC) insurance carriers, for example, may receive claims related to injuries sustained by workers while on a job for an employer who has a WC policy with the insurance carrier. To determine whether to accept a WC claim and thus pay out benefits under the insurance policy, claim professionals may investigate a claim once a report of the claim is submitted and information supporting the claim is received (e.g., a medical report from a treating medical professional who examined the injured worker). Unfortunately, the investigation of a WC claim is often unnecessarily delayed due to the employer not reporting the claim for some time after the occurrence of the injury (e.g., it is typical for an employer to not report a claim for about three months). Such delays result in inefficient use of resources for all parties involved, frustration, anxiety and confusion on the part of the injured worker, excess costs to the insurance carrier and unnecessarily lengthy return-to-work time frames for the injured worker. Yet despite this typical delay in employers timely reporting WC claims to an insurance carrier, previous practices have failed to implement a method which effectively reduces the time from the injury to the report of the WC claim into the insurance carrier's system and thus optimizes the claim investigation time frame, benefits and timeliness of benefits provided by the insurance carrier.

BRIEF DESCRIPTION OF THE DRAWINGS

An understanding of embodiments described in this disclosure and many of the attendant advantages may be readily obtained by reference to the following detailed description when considered with the accompanying drawings, wherein:

FIG. 3 is a diagram of a database according to one or more embodiments of the present disclosure;

FIG. 7 depicts an example user interface according to some embodiments of the present disclosure;

FIG. 8 depicts an example user interface according to some embodiments of the present disclosure;

DETAILED DESCRIPTION

A. Introduction

Figure 1A:
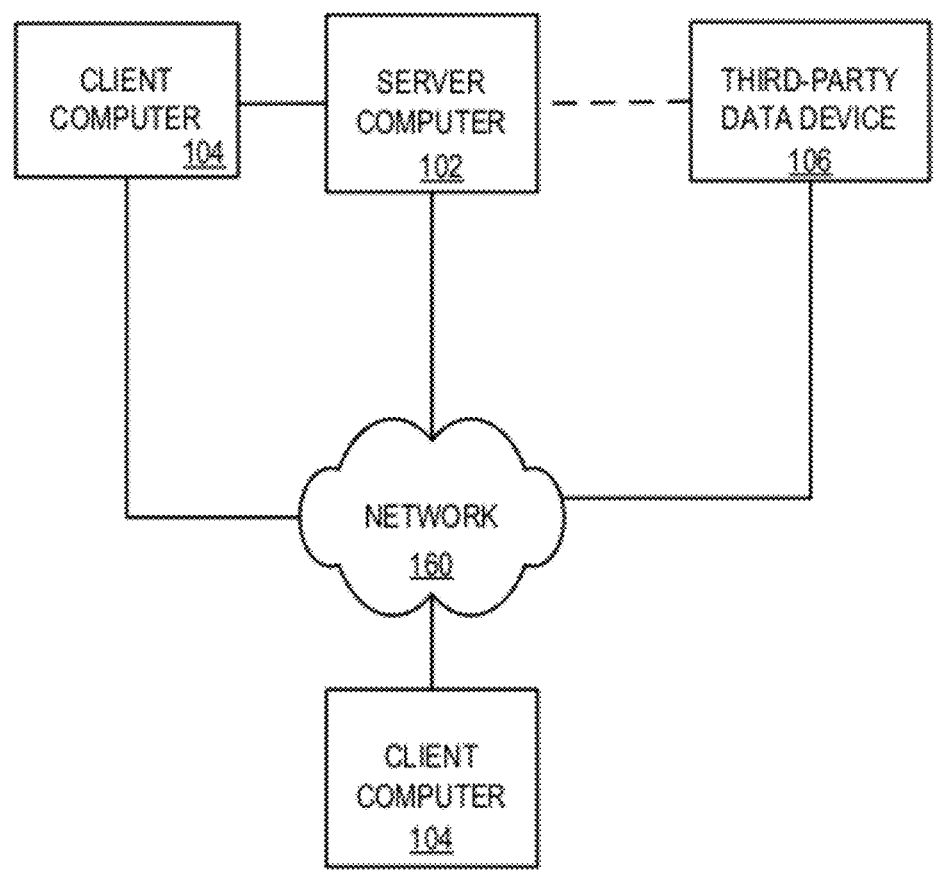
FIG. 1A is a diagram of a system according to one or more embodiments of the present disclosure.

Applicants have recognized that, in accordance with some embodiments described in this disclosure, insurance providers, medical care providers, claim professionals, employers, injured workers themselves and others involved in assessing, investigating or determining an acceptance of a WC claim would realize significant benefits from methods that would result in a report of the WC claim being entered into the insurance provider's system earlier rather than later, thus allowing for an investigation of the WC claim to be initiated in a more timely manner. For example, earlier reporting of a claim into an insurance provider's system could provide in more efficient, timely and cost-effective determination of the severity and circumstances of the injury, determination of any benefits the injured worker may be entitled to, assessment of any available manners of minimizing the return-to-work (RTW) time, providing more effective treatment and identifying modified duties the injured worker may perform while the injury heals.

Applicants have recognized that some claim professionals investigating a claim may find it beneficial to obtain information regarding a WC claim that is collected as close in time to the time of the injury as possible, by an entity trained by the claim provider in obtaining such information. For example, collection of such information may be more valuable and/or informative if it is collected via a face-to-face interview with the injured worker when the injured worker first reports the injury to a medical facility (e.g., a clinic staffed by treating medical professionals such as nurses and physicians). A treating medical professional, as used herein, may be a treating physician, nurse or other entity with formal medical training, who (with respect to the injured worker and in accordance with some embodiments) takes vital signs, provides diagnoses, prescriptions, and/or treatment recommendations. Applicants have further recognized that an injured workers anxiety and confusion may be significantly alleviated by such a face-to-face and timely interaction with an insurance medical liaison (or concierge or facilitator) who may be knowledgeable about the processes and benefits available to the injured worker from a relevant insurance provider. Similarly, a claim professional investigating other types of personal or injury (e.g., bodily injury, psychological injury or emotional injury) claims, such as property/casualty claims, face similar delays in being able to complete claim investigations due to delays in reporting claims by policy holders and lack of access to the injured person (whether it be an injured worker or another person) in a manner that allows a face-to-face and timely interaction between the injured person and the insurance medical liaison.

Unfortunately, current systems and methods do not provide to insurance providers timely reporting of WC (or other) claims in a substantial number of claims, and do not provide information derived in a personal interaction (or interview) with the injured worker or other injured person conducted relatively close in time (e.g., within twenty-four (24) hours or another reasonable time period for the reporting of an injury)

to the occurrence of the injury or when the injured worker first arrives at a medical facility for an evaluation of the injury. Typically, when an employer determines that a worker has been injured at work or otherwise may have a WC claim, the employer refers the employee to a point of entry medical clinic (or other location at which the worker's injury may be assessed by insurance medical liaisons) that the employer has designated for its WC injuries. When the worker arrives at the clinic, the clinic personnel will perform an intake procedure via which the worker's information is gathered (e.g., demographic information about the worker, employer identification, insurance carrier identification for the employer's WC claims, a description of accident that cause the injury, a description of the injury). The worker will then be examined by a clinic treating medical professional, who will issue a medical report to the insurance carrier (which may be referred to as a First Medical Report, a Doctor's First Report of Occupational Injury or Illness or a like name) and arrange for the injured worker to receive appropriate medical treatment and follow-up treatment, if necessary or desirable.

In many insurance provider systems, prior to the embodiments described in the present disclosure, a WC claim is first reported to the WC insurance provider by an employer of the injured worker. For example, an employer may use a telephone to contact a telephone reporting center to report a WC claim or a computer interface to report a WC claim via a website affiliated with the insurance provider. The initial report of the WC claim from the employer may include information such as the name and social security number of the injured worker, the employer's address and location of the injury and a description of the accident that caused the injury. This information may then be routed (e.g., from a telephone reporting center) to a local claim service center via a claim management system (e.g., TravPro™ of TRAVELERS). At the local claim service center, a case or claim handler is assigned to the claim. Ideally, this reporting of the WC claim to the insurance carrier should occur shortly after the employer learns of the injury or WC claim (e.g., as the employer refers the injured worker to the clinic), such that a WC claim is established in the insurance carrier's system by the employer prior to the treating medical professional issuing the First Medical Report to the insurance carrier.

Unfortunately, it is typical for an employer to delay the reporting of the WC claim many times for a month or even up to a year or more. This delay in reporting by the employer may be due to the employee not informing the employer of the injury, due to the employer being overly busy, or due to other reasons. Thus, it is not unusual for an insurance provider to receive a medical report from a treating medical professional who examined the injured worker before an employer ever reports the associated WC claim to the insurance provider. Since an official investigation of the WC claim (and thus the determination of any benefits the injured worker may be entitled to) cannot be substantially undertaken and/or completed until the report of the WC claim is received into the insurance provider's system, the receipt of the a medical report from a treating medical professional may be what causes the insurance provider to contact the employer and request a report of the WC claim. Again, due to the time it takes to report a claim, the reporting of the claim may be delayed by the employer even upon receiving such a request from the insurance provider. In the meantime, during this delay in reporting the WC claim, the injured worker may be unnecessarily anxious and confused. Moreover, the care and treatment the injured worker may be receiving (or not receiving) may be inefficient or inappropriate based on what benefits the injured worker is entitled to under the employer's WC policy. For example, the injured worker may refuse or procrastinate physical therapy (for worry of the cost and that it will not be covered under the WC policy) or may be receiving prescriptions or treatment from an out-of-network provider and thus unnecessarily incurring costs. The inefficiencies created by the delays in employers timely reporting WC claims has been recognized by the insurance provider industry. However, to date, efforts to address this problem have been limited to attempts at educating and encouraging employers to be more timely in reporting WC claims. Unfortunately, such efforts have been inadequate and the problem of delayed WC claim reporting by employers continues to plague the industry.

Applicants have recognized that many of the aforementioned detriments due to employer delay in reporting a WC claim to an insurance provider may be alleviated effectively by providing for an alternate reporting mechanism of the WC claim. For example, an insurance medical liaison trained to enter claims into a system of the insurance provider may be embedded into a location at which the injured worker and relevant injury may be evaluated. In some embodiments described in the present disclosure, such a insurance medical liaison may comprise medical personnel (e.g., a nurse, doctor or other person with formal medical training) that may be located at a medical clinic designed by an employer for the employer's WC claims or at an employer's place of business, job site or another location at which an employee may sustain an injury, such that the insurance medical liaison may personally interact (e.g., interview and evaluate) the injured worker when the injured worker first reports to the clinic. Of course, a insurance medical liaison, as the term is used herein, need not be skilled in the medical field or have received any medical training For example, a claim handler from an insurance provider's office may be a insurance medical liaison in some embodiments. It is sufficient that a insurance medical liaison is an entity (e.g., a live or virtual person) affiliated with and trained (or programmed, as the case may be) by the insurance company to interface with injured workers and which entity is located at a site at which an injured worker's injury is first evaluated or at a site to which the injured worker is directed for evaluation of his/her injury, even is such insurance medical liaison does not perform a medical evaluation of the injured worker or injury.

In one embodiment, the insurance medical liaison may comprise an apparatus operable to facilitate input of information from the injured worker (e.g., a kiosk or other apparatus). In some embodiments, such an apparatus may be located at or near a job site or other location at which the injured worker may sustain an injury. Such an apparatus may be operable to support a virtual rendition of a person such that the injured worker feels more comfortable providing information related to the injury. In some embodiments, such an apparatus may include one or more input devices (e.g., touch screens, microphones and/or sensors) to aid in the collection of information from the injured worker.

Applicants have recognized that providing a insurance medical liaison trained in reporting a WC claim to the insurance provider such that the insurance provider does not depend on the employer reporting the claim has advantages beyond minimizing or eliminating any unnecessary delays in providing an initial report of the WC claim. For example, having a insurance medical liaison trained by the insurance provider in particular skills be present to obtain information directly from the injured worker (e.g., at a time relatively close to the occurrence of the injury (e.g., within twenty-four (24) hours of the injury or another reasonable time period for the reporting of an injury) and/or when the injured worker's injury and physical and mental state are first evaluated by a insurance medical liaison provides valuable information previously unavailable to the insurance provider. For example, observations regarding the demeanor of the injured worker and the worker's visible reaction to certain questions may now be obtained while the memory of the injury is fresh in the injured worker's mind and while the injured worker is likely to be in a more unguarded and candid state of mind. In prior art systems, interview of the injured worker by a person affiliated with the insurance provider occurred some time after the injury (e.g., several days to several months after the injury) and thus valuable information may be left uncaptured.

Additional benefits made possible by the embodiments described in the present disclosure include, without limitation: (i) reduced costs for treating the injury and/or reduced out-of-pocket costs to the injured worker (e.g., the insurance medical liaison reporting the claim may steer the injured worker to an appropriate in-network pharmacy, therapist or physician and may ensure (e.g., by communicating with the treating medical professional who evaluates the injured worker) that an insurance-approved medication is prescribed to the injured worker); (ii) reduced return-to-work time frames (e.g., by the insurance medical liaison mediating between the injured worker and the employer to identify acceptable modified duties the injured worker may perform or recommending additional therapy or treatment the injured worker may undertake); (iii) reduced time-frame from the time of the injury for a final decision as to what benefits the injured worker is entitled to (e.g., since investigation of claim may be initiated sooner and without the delay of waiting for the employer to report the WC claim to the insurance provider system); (iv) reduced anxiety on the injured worker's part (e.g., the insurance medical liaison may help the injured worker more quickly understand any benefits the injured worker is definitely or likely to qualify for); and (v) increased efficiencies realized from, in accordance with some embodiments, having the insurance medical liaison obtain information directly from the treating medical professional by being able to interface face-to-face with the treating medical professional and being able to read the treating medical professional's notes in the injured worker's medical chart.

In some embodiments, as described, the insurance medical liaison is located at a medical clinic or other facility at which an injured worker is evaluated by a treating medical professional. Thus, in such embodiments many efficiencies may be realized because such an arrangement provides the insurance provider, via the insurance medical liaison, to interact personally with the treating medical professional and obtain information directly from the treating medical professional in a timely manner, such that the insurance provider may obtain information about the injured worker and/or the injury quickly and efficiently. As described, in prior systems an insurance provider typically waited to obtain information from the treating medical professional via a Doctor's First Report, which consists of a formal written communication from the treating medical professional to the insurance provider. A compensability determination with respect to a workers compensation claim is based in part on the information contained in such a written Doctor's First Medical Report. In embodiments described herein, a insurance medical liaison may talk to the treating medical professional immediately (or any time thereafter) the treating medical professional evaluates and examines the injured worker and has access to the treating medical professional's chart on the injured worker. Thus, the insurance medical liaison may obtain the treating medical professional's thoughts on the diagnosis, injury and recommended treatments (e.g., by discussing any of the foregoing with the treating medical professional or looking at the treating medical professional's notes in the injured worker's chart) and obtain actionable information even before the treating medical professional issues the formal written communication comprising the Doctor's First Report. In some embodiments, it may be arranged for the insurance medical liaison to receive a verbal report from the treating medical professional of the diagnosis and/or treatment for the injured worker, which the insurance medical liaison can then provide to the insurance provider, thus allowing the compensability determination to proceed more efficiently.

In accordance with some embodiments, systems, apparatus, methods and articles of manufacture provide for: (i) receiving, in a claim reporting system residing on a computing device and operable to facilitate the reporting of workers compensation insurance claims, a information relating to a workers compensation claim (or, in some embodiments, another type of claim such as a property/casualty claim), the information being provided by a insurance medical liaison located at a location at which an injured worker (or, in some embodiments, another injured person) has been evaluated; (ii) receiving information indicative of an evaluation, by the insurance medical liaison who is providing a report of the claim, of at least one of the work-related injury and the injured worker; and (iii) establishing a new record in the claim reporting system for the workers compensation claim based on the report and the information indicative of the evaluation, both received from the insurance medical liaison. In some embodiments, the information indicative of the evaluation is received at substantially a time at which the report of the claim is received (e.g., the insurance medical liaison writes a note indicating the information while first reporting the claim into the insurance provider system) while in other embodiments the information indicative of the evaluation is provided some time (e.g., within twenty-four (24) hours) after the insurance medical liaison reports the WC claim (e.g., the insurance medical liaison may report the WC claim upon the injured worker reporting to a clinic at which the insurance medical liaison is located and then submit a note describing the evaluation later that day or the next day). It should be noted that references to a WC claim herein may be applicable to other types of claims and the embodiments described herein should not be limited to a WC type of insurance claim. Similarly, embodiments referring to an injured worker may, in certain circumstances, be applicable to another injured person besides the injured worker.

In accordance with some embodiments, the information indicative of an evaluation comprises at least one of (i) least one observation, made by the insurance medical liaison, about a demeanor of the injured worker while at the location; (ii) least one vital sign measurement, taken by the insurance medical liaison, of the injured worker while at the location; (iii) at least one recommended treatment for the injured worker; (iv) at least one opinion, of the insurance medical liaison, regarding a mental state of the injured worker; (v) at least one answer provided by the injured worker during an in-person interview of the injured worker conducted by the insurance medical liaison at the location; (vi) an indication of whether the injured worker requested a presence of an attorney prior to answering a question from the insurance medical liaison while at the location; (vii) an opinion provided to the insurance medical liaison from a claim representative regarding compensability of the claim, the opinion being provided prior to an investigation of the claim being finalized; (viii) an indication of at least one recommendation provided to the injured worker by the insurance medical liaison prior to the injured worker leaving the location (e.g., a recommendation for at least one of a treatment regiment, a physician, a medicine, a therapist, a pharmacy and a modified duty the injured worker may perform).

In accordance with some embodiments, additional information helpful to an investigation of the WC claim may be received from the insurance medical liaison who reported the WC claim to the insurance provider. For example, the insurance medical liaison may provide a description of a conversation initialized by the insurance medical liaison with an employer of the injured worker while the injured worker is at the location. In some embodiments, the description of the conversation may include a description of at least one modified duty the employer agreed the injured worker may perform while injured. In some embodiments, the insurance medical liaison may facilitate a treating medical professional authorizing a modified duty the injured worker may perform by discussing possible modified duties with the employer and obtaining agreement and authorization from the treating medical professional treating the injured worker as to one or more of the modified duties.

Any information received from the insurance medical liaison may be stored in one or more records of one or more databases of the insurance provider with which the insurance medical liaison is affiliated (e.g., the information may first be received at a claim reporting system administered by a third party affiliated with the insurance provider and subsequently transmitted to a claim management system administered by the insurance provider).

In some embodiments, an employer (or another entity) of the injured worker may have reported the WC claim in a timely manner and a record of the WC claim may thus already exist in a system of the insurance provider upon the insurance medical liaison attempting to first report the same WC claim to the insurance provider. Thus, in some embodiments, systems, apparatus, methods and articles of manufacture may provide for determining whether a claim for the work-related injury has previously been reported (e.g., by the employer of the injured worker). In some embodiments, such a determination may be performed upon receiving the report of the workers compensation claim from the insurance medical liaison or may even be performed by the insurance medical liaison (e.g., the insurance medical liaison may search a database of the insurance provider system for a previous report of the WC injury). If it is determined that the work-related injury has not previously been reported by the employer (or another entity), the systems, apparatus, methods and articles of manufacture described in the present disclosure provide for establishing a new record in the claim reporting system of the insurance provider for the work-related injury based on the information provided by the insurance medical liaison and storing, in the record, the information. If it is determined that the work-related injury has previously been reported by the employer (or another entity) the systems, apparatus, methods and articles of manufacture described in the present disclosure provide for storing the information provided by the insurance medical liaison in a record previously established in the claim reporting system for the work-related injury.

In some embodiments, the information provided by the insurance medical liaison and stored in the record established based upon the report provided by the insurance medical liaison may be combined with information provided by at least one of the employer and the injured worker at a time the claim was previously reported by the at least one of the employer and the injured worker.

In some embodiments, an employer of the injured worker may initiate a report of the WC claim after the record for the claim based on the report provided by the insurance medical liaison has been established. In such embodiments, systems, apparatus, methods and articles of manufacture described in the present disclosure provide for storing information provided by the at least one of the employer and the injured worker to the previously established record.

In some embodiments, the insurance medical liaison may comprise a live person (e.g., a nurse), a virtual representation of a person (e.g., an image of a person displayed to the injured worker via a device such as a kiosk) and/or software stored on a device located at the location at which the injured worker is located. In some embodiments, such software may be operable to receive information from at least one sensor located at the location, the sensor operable to determine at least one condition (e.g., a condition of the injured worker and a condition of an apparatus being utilized by the injured worker).

In some embodiments, systems, apparatus, methods and article of manufacture provide for (i) receiving a medical report from a treating medical professional, the medical report indicating an evaluation of an injury of an injured worker; (ii) authorizing, prior to a report of the claim by either an employer of the injured worker or the injured worker if a report of the claim has previously been received from a insurance medical liaison distinct from the treating medical professional who evaluated the injured worker shortly after the injury occurred, initiation proceeding of an investigation by a claim professional of a workers compensation claim for the injury and based on the medical report.

The receiving of the medical report may comprise indirectly receiving the medical report from the treating medical professional, for example by having the medical report reported by a insurance medical liaison who has obtained the medical report. For example, in some embodiments, the medical report may be a verbal report provided by a treating medical professional to a insurance medical liaison, who in turn provided the report to the claim reporting system or claim management system of an insurance provider. In some embodiments, the medical report may comprise information obtain from a medical chart of the injured worker, such as a treating medical professional's notes regarding the injury and/or the injured worker. For example, a insurance medical liaison may be authorized to access the medical chart and obtain information ther from, then report the information to the insurance provider. In some embodiments, the medical report may comprise a written communication (e.g., a Doctor's First Report) from a treating medical professional who examined the injured worker.

In some embodiments, the report of the claim received from the insurance medical liaison includes information related to an evaluation of the injury. In such embodiments, the systems, apparatus, methods and articles of manufacture of the present disclosure may provide for comparing the information in the report of the claim to the indication of the evaluation included in the medical report.

In some embodiments, systems, apparatus, methods and articles of manufacture provide for (i) receiving, from a first entity distinct from an employer or an injured worker, an initial report of a workers compensation claim for an injury of the injured worker; (ii) receiving, from the first entity, a description of an in-person evaluation of the injured worker, the evaluation occurring within twenty-four hours of the injury occurring; (iii) receiving, from a treating medical professional distinct from the first entity, a medical report of the injury; and (iv) initiating an investigation by a claim professional of the workers compensation claim based on the initial report received from the first entity. In some embodiments, the insurance medical liaison may comprise an entity affiliated and trained by the insurance provider.

It should be noted that the embodiments described herein are applicable to a variety of different and disparate work-related injuries in a variety of occupations, including injuries of feel truck drivers and other transportation-related injuries.

B. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

The term "insurance provider", as used herein, may include a company in the business of selling and administering insurance policies to individuals and/or other companies, including WC policies. In some embodiments, an insurance provider is also responsible for investigating claims under an insurance policy, determining the benefits (if any) to be paid out for such a claim and/or paying out or otherwise providing such benefits. In some embodiments, one or more functions of an insurance provider may be carried out by a Third Party Administrator, which may be affiliated with an insurance provider and/or a policy holder. It should be understood that wherever the term "insurance provider" is used herein, the term "Third Party Administrator" or "TPA" may be substituted without departing from the spirit and scope of the embodiments.

The term "medical procedure", as used herein, may include one or more of various procedures such as are contemplated, for example, under medical treatment guidelines (e.g., ACOEM guidelines) and/or procedure classification systems such as CPT.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

In some embodiments, "reporting" a claim is described. As used herein, to "report" a claim (e.g., a WC claim) may be used to refer to providing information relevant to a WC claim and need not necessarily mean that the reporting of the claim is the first or original indication of the claim to the insurance provider. However, the term "originally reporting" a claim may be used herein to indicicate that a particular report or reporting of a claim is the original or first indication of the claim that the insurance provider receives. It should be noted that any reference to "reporting" of a claim or a "report" of a claim may be substituted with "originally reporting of" or "original report of" or "to originally report" a claim to indicate a scenario in which the report or reporting in question is the original or first indication the insurance provider has of the claim.

C. General Systems and Structures

FIG. 1A depicts a block diagram of an example system 100 according to some embodiments. The system 100 may comprise one or more client computers 104 in communication with a controller or server computer 102 via a network 160. Typically a processor (e.g., one or more microprocessors, one or more microcontrollers, one or more digital signal processors) of a client computer 104 or server computer 102 will receive instructions (e.g., from a memory or like device), and execute those instructions, thereby performing one or more processes defined by those instructions. Instructions may be embodied in, e.g., one or more computer programs and/or one or more scripts.

In some embodiments a server computer 102 and/or one or more of the client computers 104 stores and/or has access to data useful for assessing a WC claim. Such information may include one or more of: (i) injury data (e.g., date, time and location at which injury occurred, description of the injury); (ii) information (e.g., observations, injured worker's answers, vital sign measurements) obtained by a insurance medical liaison who interviewed the injured worker shortly after the occurrence of the injury and/or when the injured worker first reported to a medical facility for an evaluation of the injury; (ii) medical care component information (e.g., recommended treatment procedures, prescription information), (iii) medical history of injured worker; and (iv) information regarding the WC policy held by the injured worker's employer.

According to some embodiments, any or all of such data may be stored by or provided via one or more optional third-party data devices 106 of system 100. A third-party data device 106 may comprise, for example, an external hard drive or flash drive connected to a server computer 102, a remote third-party computer system for storing and serving data for use in reporting, assessing and/or managing WC claims, or a combination of such remote and local data devices. A third-party entity (e.g., a party other than an owner and/or operator, etc., of the server computer 102, client computer 104 and other than an end-user of any data used in medical cost assessment) such as a third-party vendor collecting data on behalf of the owner, a marketing firm, government agency and/or regulatory body, and/or demographic data gathering and/or processing firm may, for example, monitor patient and/or claim data for various purposes deemed useful by the third-party, including data mining, data analysis, and any raw data and/or information may be stored on and/or via the third-party data device 106.

In some embodiments, a client computer 104 may comprise a computer workstation or terminal of a insurance medical liaison of an insurance provider (e.g., a nurse working at a medical clinic) or a claim professional of the insurance provider (e.g., working at a business facility of the insurance provider). In some embodiments, the client computer 104 may be used to report a WC claim, add information to a record of a WC claim, assess information stored regarding a WC claim and/or manage an investigation of a WC claim. In one embodiment, the client computer 104 comprises a handheld device (e.g., a dedicated mobile device) used by a insurance medical liaison (e.g., a nurse) to report information about a WC claim to the a system of an insurance provider. Any and all information relevant to any of the aforementioned functions may be stored locally on the client computer 104 and/or may be accessed using the client computer 104 (such information being stored on, or provided via, the server computer 102 and/or the third-party data device 106). In another embodiment, the server computer 102 may store some or all of the program instructions for reporting, assessing and/or managing a WC claim, and the client computer 104 may access such information and/or program instructions remotely via the network 160 and/or download from the server computer 102 (e.g., a web server) some or all of the program code for executing one or more of the various functions described in this disclosure.

In one embodiment, a server computer 102 may not be necessary or desirable. For example, some embodiments described in this disclosure may be practiced on one or more devices without a central authority. In such an embodiment, any functions described herein as performed by a server computer 102 and/or data described as stored on a server computer 102 may instead be performed by or stored on one or more such devices. Additional ways of distributing information and program instructions among one or more client computers 104 and/or server computers 102 will be readily understood by one skilled in the art upon contemplation of the present disclosure.

Figure 1B:
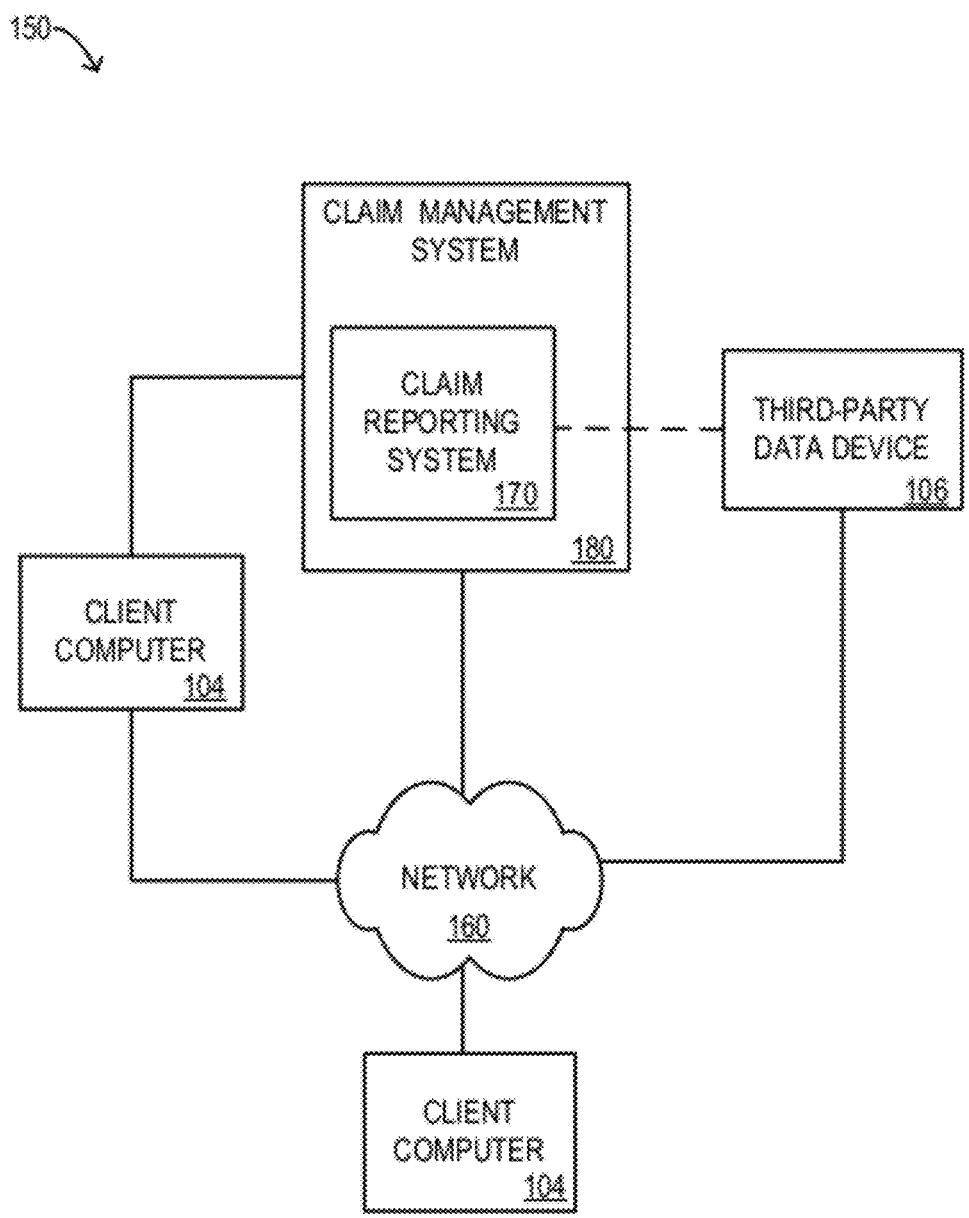
FIG. 1B is a diagram of a claim management system according to one or more embodiments of the present disclosure.

FIG. 1B depicts a block diagram of another example system 150 according to some embodiments. The system 150 may comprise one or more client computers 104 in communication with a claim management system 180 (such as may be hosted by, for example, a server computer 102) via a network 160. A WC claim reporting system 170 is integrated into the central claim management system 180, for example, as a module or other functionality accessible through the claim management system 180. In one embodiment, information about a particular WC claim and stored by the claim management system 180 may be first reported to an insurance provider via the WC claim reporting system 170. For example, information about an injured claimant, such as age and state of residence, and observations about the injured claimant (e.g., demeanor, reaction to certain questions, body language, vital signs) obtained by a insurance medical liaison who interviewed the injured claimant and reported the WC claim to the insurance medical liaison may be reported to the insurance company via the WC claim reporting system and subsequently transmitted, transferred or communicated to the claim management system 180 (e.g., without requiring manual input by a claim professional). As discussed above with respect to system 100 of FIG. 1A, in some embodiments one or more third-party data devices 106 may store information (e.g., information provided by a insurance medical liaison initially reporting a WC claim) used in managing and investigating a WC claim.

Figure 1C:
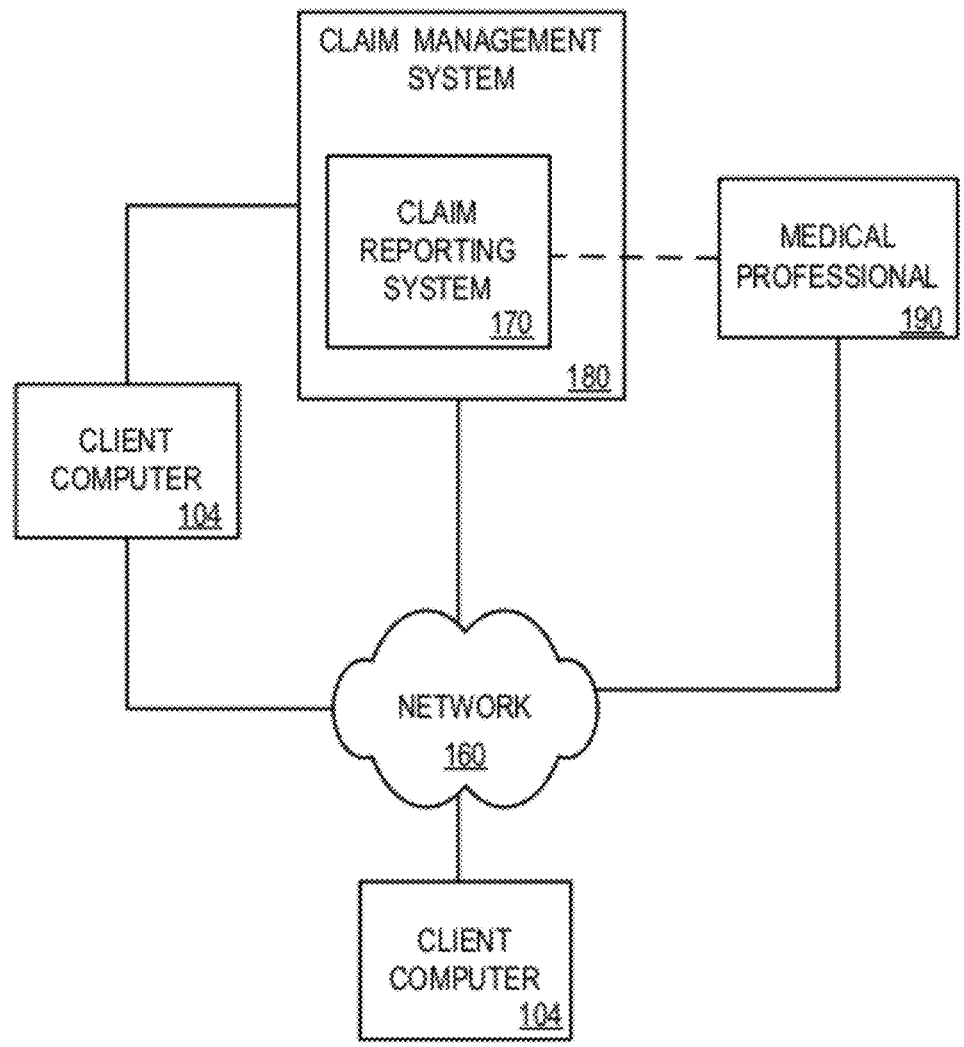
FIG. 1C is a diagram of a system according to one or more embodiments of the present disclosure.

FIG. 1C depicts block diagram of another example system 175 according to some embodiments. The system 175 may comprise one or more client computers 104 in communication with a claim management system 180 and an insurance medical liaison 190. In some embodiments, the system 190 may also include one or more optional third-party data devices 106. The insurance medical liaison 195 may comprise, for example, an apparatus (e.g., a kiosk), sensor, mobile device, communication device and/or computing device operable to interact with an injured worker (e.g., over code division multiple access (CDMA) communications methods or other communications technologies). For example, in some embodiments, the insurance medical liaison may comprise software, hardware and/or firmware that is operable to perform at least one or more of the following functionalities: (i) remote diagnostics (e.g., determining, monitoring, evaluating or sensing a condition of a system, apparatus, situation, person or ambient condition); (ii) interactions with a claim reporting and/or claim management system of an insurance provider (e.g., providing information descriptive of an injury and/or an injured worker for purposes of reporting a WC claim); (iii) contacting, communicating with or otherwise interacting with personnel of an insurance provider; (iv) depicting a virtual person in the guise of a nurse or doctor that outputs questions, instructions, guidance or other information to an injured worker and allows the injured worker to provide input (directly or indirectly); (v) providing a mechanism for an injured (or potentially injured) worker to input information (e.g., via an audio and/or video interface); and (vi) outputting information, instructions and/or guidance to an injured (or potentially injured) worker (e.g., via an audio and/or visual interface); and (vi) detecting an occurrence of an event (e.g., a potential injury of a worker). For example, the insurance medical liaison may comprise a kiosk with a touchscreen and microphone that allows an injured worker to input information that facilitates the reporting of a WC claim to the insurance provider claim reporting system (e.g., the kiosk outputting a virtual representation of a nurse that asks the injured worker questions and/or takes vital sign measurements of the injured worker). In another example, the insurance medical liaison may comprise an advanced technology device that is a component or separate device interacting with machinery or apparatus being operated by a worker (e.g., a sensor built into a machine being operated by the worker). In some embodiments, the insurance medical liaison 190 may comprise an artificial intelligence engine and/or decision tree technology for facilitating the detection of an injury or potential injury, obtaining information on the injury or potential injury, reporting of a WC claim for the injury or potential injury and providing information, instructions and/or guidance to the injured worker.

Figure 2:
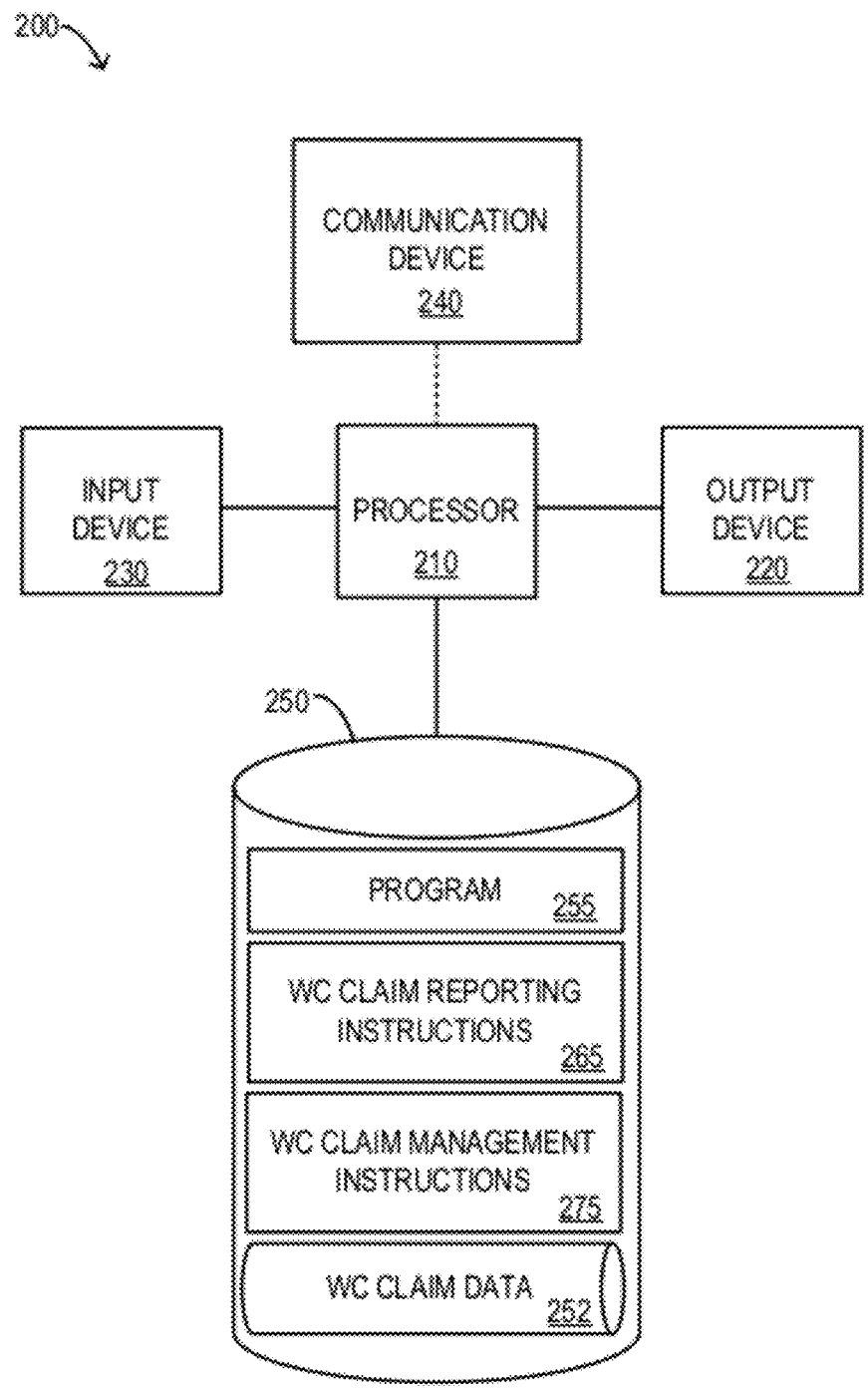
FIG. 2 is a diagram of a computer system according to one or more embodiments of the present disclosure.

Turning to FIG. 2, a block diagram of an apparatus 200 according to some embodiments is shown. In some embodiments, the apparatus 200 may be similar in configuration and/or functionality to any of the client computers 104, server computers 102, third-party data devices 106, the claim management system 180 and/or the insurance medical liaison 190 of FIG. 1A, FIG. 1B and/or FIG. 1C. The apparatus 200 may, for example, execute, process, facilitate, and/or otherwise be associated with any of the processes 400, 500 and 600, described in conjunction with FIG. 4, FIG. 5 and FIGS. 6A, 6B and 6C herein.

In some embodiments, the apparatus 200 may comprise a processor 210, an output device 220, an input device 230, a communication device 240 and/or a memory device 250. Fewer or more components and/or various configurations of the components 210, 220, 230, 240 and/or 250 may be included in the apparatus 200 without deviating from the scope of embodiments described herein.

According to some embodiments, the processor 210 may be or include any type, quantity, and/or configuration of processor that is or becomes known. The processor 210 may comprise, for example, an Intel® IXP 2800 network processor or an Intel® XEON™ Processor coupled with an Intel® E7501 chipset. In some embodiments, the processor 210 may comprise multiple inter-connected processors, microprocessors, and/or micro-engines. According to some embodiments, the processor 210 (and/or the apparatus 200 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 200 comprises a server such as a blade server, necessary power may be supplied via a standard AC outlet, power strip, surge protector, and/or Uninterruptible Power Supply (UPS) device.

In some embodiments, the input device 230 and/or the output device 220 are communicatively coupled to the processor 210 (e.g., via wired and/or wireless connections and/or pathways) and they may generally comprise any types or configurations of input and output components and/or devices that are or become known, respectively.

The input device 230 may comprise, for example, a keyboard that allows an operator of the apparatus 200 to interface with the apparatus 200 (e.g., by a insurance medical liaison, such as to input information related to the reporting of a WC claim; by a claim professional, such as to assess whether an investigation of a WC claim may proceed based upon a reporting of a WC claim and/or to investigate a WC claim). In some embodiments, the input device 230 may comprise a sensor configured to provide information such as an indication of a potential injury and/or WC claim to the apparatus 200 and/or the processor 210.

In embodiments in which apparatus 200 comprises a insurance medical liaison 190, input device 230 may comprise a sensor or other detection device (e.g., a device operable to receive and respond to a signal or stimulus). Such a sensor and/or detection device may comprise a device operable to identify, determine or sense an occurrence of a condition or event and/or a change in a condition or status of an event. For example, the sensor or detection device may comprise one or more of a visual sensor that identifies and/or responds to visual stimulus (e.g., a camera), an acoustic sensor that identifies and/or responds to sound and/or vibration (e.g., a microphone), an automotive sensor that identifies and/or responds to transportation-related information (e.g., speed, throttle position or variable reluctance sensor, an impact sensor), a temperature sensor, a chemical sensor (e.g., a carbon monoxide sensor, a carbon dioxide sensor, an olfactometer, a potentiometric sensor, a smoke detector), an environmental sensor (e.g., a seismometer, a tide gauge, a gas gauge, a moisture sensor, a particle detector, thermometer), a weight sensor, an altimeter, a depth gauge, a proximity sensor (e.g., a motion detector, an occupancy sensor), and/or tactile sensor (e.g., touch-sensitive buttons on a screen or apparatus).

The output device 220 may, according to some embodiments, comprise a display screen and/or other practicable output component and/or device. The output device 220 may, for example, provide instructions, guidance, questions or information to an injured worker seeking to report an injury and/or an evaluation of an injury. In another example, an output device 220 may output information (e.g., a user interface for entering data) to a insurance medical liaison seeking to report a WC claim and/or input observations about an injured worker who is the subject of a WC claim (e.g., via a computer workstation). According to some embodiments, the input device 230 and/or the output device 220 may comprise and/or be embodied in a single device such as a touch-screen monitor.

In some embodiments, the communication device 240 may comprise any type or configuration of communication device that is or becomes known or practicable. The communication device 240 may, for example, comprise a NIC, a telephonic device, a cellular network device, a router, a hub, a modem, and/or a communications port or cable. In some embodiments, the communication device 240 may be coupled to provide data to a telecommunications device. The communication device 240 may, for example, comprise a cellular telephone network transmission device that sends signals (e.g., claim information, initial reports of a WC claim) to a server in communication with a plurality of handheld, mobile and/or telephone devices. According to some embodiments, the communication device 240 may also or alternatively be coupled to the processor 210. In some embodiments, the communication device 240 may comprise an IR, RF, Bluetooth™, and/or Wi-Fi® network device coupled to facilitate communications between the processor 210 and another device (such as one or more client computers, server computers, central controllers, insurance medical liaisons and/or third-party data devices).

The memory device 250 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 250 may, according to some embodiments, store a program 255 for facilitating one or more of the embodiments described herein, one or more of WC claim reporting instructions 265, one or more claim management instructions 275, and/or WC claim data 252. In some embodiments, the claim reporting instructions 265 and/or claim management instructions 275 may be utilized by the processor 210 to provide output information via the output device 220 and/or the communication device 240 (e.g., via the user interfaces 700, 800 and/or 900 of FIG. 7, FIG. 8 and FIG. 9, respectively).

According to some embodiments, claim reporting instructions 265 may be operable to cause the processor 210 to process information indicative of an initial report of a WC claim as described herein. Any WC claim data 252 received via the input device 230 and/or the communication device 240 may, for example, be data mined, analyzed, sorted, filtered, decoded, decompressed, ranked, scored, plotted, and/or otherwise processed by the processor 210 in accordance with the instructions of WC claim reporting instructions 265 and/or WC claim management instructions 275 (e.g., in accordance with the method 600 of FIG. 6A, FIG. 6B and FIG. 6C). In some embodiments, any information obtained by use of the WC claim reporting instructions 265 may be stored, analyzed, forwarded or otherwise utilized by the processor 210 (e.g., may be stored as WC claim data 252 and/or analyzed or forwarded to a claim specialist in accordance with WC claim management instructions 275). Such information may then be utilized for various purposes as described herein.

According to some embodiments, the WC claim reporting instructions 265 may be operable to cause the processor 210 to prompt a insurance medical liaison to input information related to a WC claim being reported by the insurance medical liaison, including in some embodiments observations of the injured worker corresponding to the WC claim, as obtained during an in-person interview of the injured worker by the insurance medical liaison (e.g., during a first medical visit of the injured worker with respect to the injury) as described herein. Some or all of the WC claim data 252 may be analyzed, viewed and/or transmitted (e.g., by or to a claim specialist) in order to determine what benefits, if any, an injured worker may be entitled to under a WC policy of the injured worker's employer, to determine whether a follow-up contact with the injured worker is necessary (e.g., to obtain additional information about the injury, to follow-up on any treatment the injured worker is receiving, to determine whether the injured worker may be able to return to work sooner than originally anticipated, etc.). The WC claim management instructions 275 may, in some embodiments, utilize the WC claim data 252 to determine benefits due to a worker, to compare data received from two disparate sources regarding the injury (e.g., observations from a insurance medical liaison who interviewed the worker to observations of a treating medical professional who examined the worker), to determine whether an investigation of the WC claim can be initiated, continued and/or finalized (e.g., based on whether the WC claim has officially been reported to the insurance provider by either the employee of the injured worker or a insurance medical liaison who was in contact with the worker when the injured worker was first examined with respect to the injury that is the subject of the WC claim).

The apparatus 200 may function as a computer terminal and/or server of an insurance and/or medical care provider, for example, that is utilized to receive and/or manage WC claims. In some embodiments, the apparatus 200 may comprise a web server and/or other portal (e.g., an IVRU) that serves as an intake portal for WC claims. In some embodiment, the apparatus 200 may comprise a workstation or mobile device utilized by a live insurance medical liaison who interviews an injured worker when the injured worker is first injured or is first examined by a treating medical professional in relation to a WC claim. In some embodiments, the apparatus 200 may comprise an apparatus that is operable to interview and/or observe the injured worker (e.g., at a location of an injury or at a location to which the injured worker reports to be examined by a treating medical professional).

Any or all of the exemplary instructions and data types described herein and other practicable types of data may be stored in any number, type, and/or configuration of memory devices that is or becomes known. The memory device 250 may, for example, comprise one or more data tables or files, databases, table spaces, registers, and/or other storage structures. In some embodiments, multiple databases and/or storage structures (and/or multiple memory devices 250) may be utilized to store information associated with the apparatus 200. According to some embodiments, the memory device 250 may be incorporated into and/or otherwise coupled to the apparatus 200 (e.g., as shown) or may simply be accessible to the apparatus 200 (e.g., externally located and/or situated).

D. Database

Referring to FIG. 3, a schematic illustration of an exemplary data structure 300 according to some embodiments is shown. In some embodiments, the exemplary data structure 300 may comprise a tabular representation illustrating an embodiment of the WC claim data 252. The exemplary data structure 300 that is representative of the WC claim data 252 includes a number of example records or entries, R300-1, R300-2 and R300-3, each of which defines a WC claim for a particular injured worker and for a particular injury of the injured worker. Those skilled in the art will understand that the WC claim data 252 may include any number of entries. Those skilled in the art will further understand that many different and/or additional fields and/or types of data may be stored in the WC claim data 252 other than those illustrated as exemplary and non-limiting. The exemplary data structure 300 of the WC claim data 252 also defines fields for each of the entries or records, including: (i) a claim number field 305, which uniquely identifies a WC claim in an insurance provider's system, (ii) a status field 310 which indicates a status of the corresponding claim, (iii) a date reported field 315 which indicates a date on which the corresponding WC claim was first reported to the insurance provider, (iv) a who reported field 320 which indicates the person or other entity that first reported the corresponding WC claim to the insurance provider, (v) a date of injury field 325 which indicates the date on which the injury of the corresponding WC claim occurred, (vi) a doctor's first report field 330 which indicates the date on which the doctor's first report (or any indication or report of a medical status of the injured worker by a treating medical professional authorized by the insurance provider and/or selected by the employer, whether written or verbal, formal or informal) was received by the insurance provider, and (vii) compensability determination initiation field 335 which indicates the date on which a claim specialist of the insurance provider first began the investigation of the claim and determination of the compensability of the claim.

Various advantages made possible by the embodiments described in the present disclosure may be appreciated and highlighted by the example data provided in the tabular representation 300. For example, as described herein, relying upon an employer to report a WC claim may result in delays in initiating a compensability determination. As described herein, it is only once a WC claim is reported to an insurance provider that the insurance provider may begin in earnest the process of verifying coverage and confirming that the injury meets the threshold for compensability established by various state laws. In many instances prior to the embodiments described herein, an insurance providers first notice of a WC claim comes when the insurance provider receives a Doctor's First Report from a treating medical professional who examined the injured worker when the injured worker reported to a medical facility (e.g., a clinic) that the employer of the injured worker designated for the employer's WC claims. In such circumstances, the insurance provider must prompt the employer to report the claim once it receives notice of the claim by virtue of receiving the Doctor's First Report. Many times, even after receiving such prompting from the insurance provider, the employer still delays reporting the claim for various reasons. Such delays may have various adverse impacts on the injured worker, the employer and/or the insurance provider. Examples of adverse impacts to the injured worker include (i) delays in payments for temporary loss of income to the injured worker, delays in compensation for permanent loss of earnings capacity, delays in vocational rehabilitation and delays in appropriate provision (or reimbursement for) medical treatment and (ii) prolonged anxiety and confusion as to what benefits the injured worker may qualify for. Examples of adverse impacts to the employer and/or the insurance provider include delays in having the injured worker return to work, in either full capacity or a modified capacity, and inefficient use in resources in attempting to gather relevant information about the injury and/or cause of the injury after a significant amount of time has passed since the injury. The novel embodiments described herein provide for a insurance medical liaison to establish contact with an injured worker and report the WC claim to the insurance provider (or, in some embodiments, work with the employer to have the employer more promptly report the claim) as the injured worker reports to the designated medical facility to have the injured examined or, in some embodiments, even sooner (e.g., at a site of the injury) This allows a compensability determination process to be initiated very quickly, as soon as the WC claim is reported and prior to the Doctor's First Report being submitted, such that once the Doctor's First Report is submitted a significant portion of the determination may have been completed and the compensability determination may be finalized shortly after the Doctor's First Report is received, without further delays.

Turning again to FIG. 3, record R300-1 illustrates an example of what may occur if a WC claims is reported by a insurance medical liaison affiliated with an insurance provider such as a nurse located at a clinic to which the injured worker reports to have his/her injury examined. As the data in record R300-1 illustrates, the WC claim "WC-1703-21" was first reported to the insurance provider on Feb. 12, 2004, which is on the same date as the injury occurred. This allows the insurance provider to investigate the claim while the memory of the event that caused the injury is still fresh in everyone's mind, which eases the investigative process. This also allows the insurance provider to become involved in the treatment of the injury at the initial stages, which may prevent inefficient, undesirable and sub-optimal treatment being provided to the injured worker. As record R300-1 also illustrates, the compensability determination process for the subject claim began one day after the claim was first reported to the insurance provider (on Feb. 13, 2004), which is also almost two weeks prior to the Doctor's First Report for the subject claim being received on Feb. 27, 2004. In many instances, this may result in a final compensability determination being made shortly after receiving the Doctor's First Report.

Now, turning to record R300-2, the efficiency of the process illustrated by the data of record R300-1 can be contrasted with the delays that may occur if the employer is relied upon as the sole source who may report a WC claim. As record R300-2 illustrates, a claim "WC-1980-43" was reported by an employer on Jan. 21, 2006, whereas the date of the injury was on Oct. 25, 2005 and the doctor's first report was received on Nov. 15, 2005. Thus, there was over a two month delay from the time the Doctor's First Report was received by the insurance provider and the date on which the employer reported the claim. As also illustrated in record R300-2, the compensation determination began on Jan. 22, 2006, the very next day after the WC claim was reported by the employer but unfortunately almost three months after the date of the injury and over two months from the receipt of the Doctor's First Report. As described herein, many inefficiencies may occur due to such a delay and having a insurance medical liaison as described herein be operable to report a WC claim in lieu of relying on an employer to do so has various advantages.

E. Processes

Figure 4:
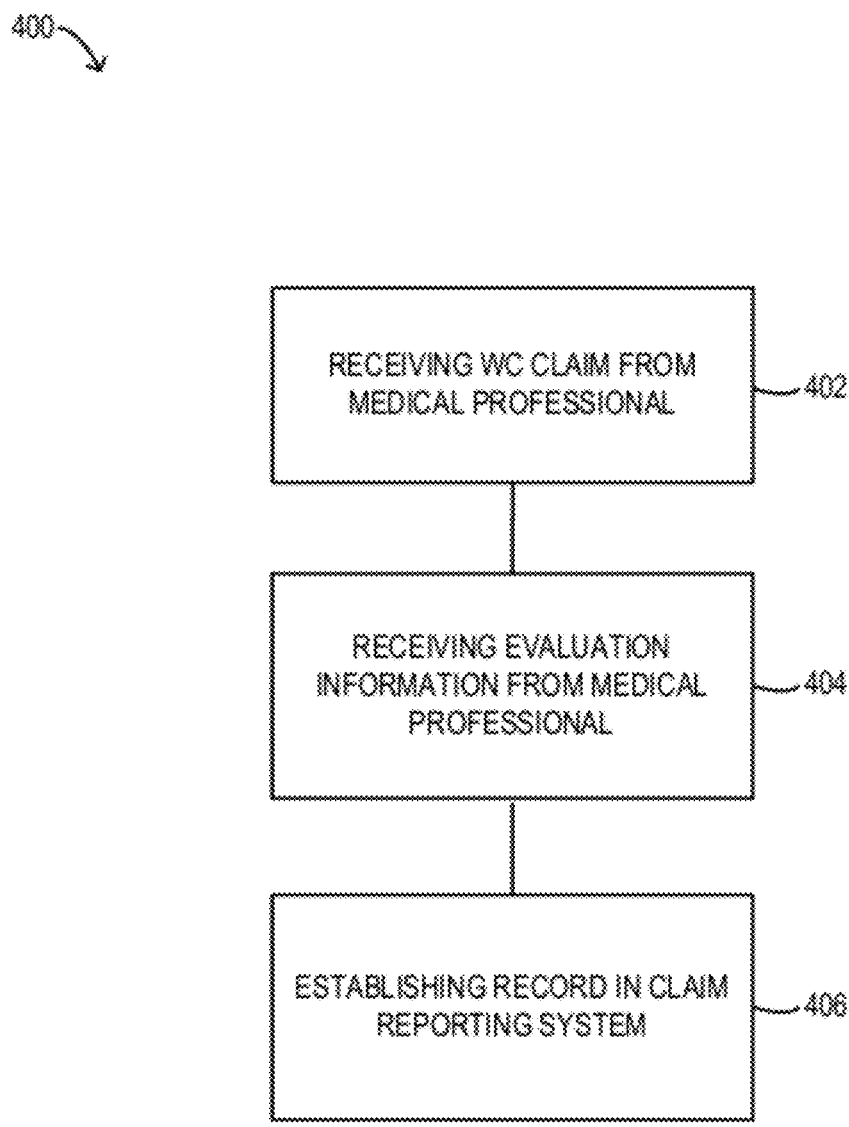
FIG. 4 is a flowchart of a method according to some embodiments of the present disclosure.

Referring now to FIG. 4, a flow diagram of a method 400 according to some embodiments is shown. The method 400 may, for example, be performed by or on behalf of an insurance provider, a claim professional, a insurance medical liaison, a medical care facility, an employer and/or an insured person or other user. For purposes of brevity, the method 400 will be described herein as being performed by a computer (e.g., a client computer operated by a claim professional) on behalf of an insurance company. It should be noted that although some of the steps of method 400 may be described herein as being performed by a client computer while other steps are described herein as being performed by another computing device, any and all of the steps may be performed by a single computing device which may be a client computer, server computer, third-party data device or another computing device. Further any steps described herein as being performed by a particular computing device may be performed by a human or another computing device as appropriate.

According to some embodiments, the method 400 may comprise receiving a information conveying a workers compensation claim, the report being provided by a insurance medical liaison located at a location at which an injured worker is or has recently been located and at which the injured worker's injury has been evaluated (402). The report may be received by, for example, a claim reporting system residing on a computing device and operable to facilitate the reporting of workers compensation insurance claims, such as claim reporting system 170 of apparatus 200 in FIG. 2. The report may be input, for example, via telephone or a web interface. For example, a insurance medical liaison (e.g., a nurse located at a medical care facility such as a clinic designated by an employer for the employer's WC claims) may input information reporting the claim via a user interface such as that illustrated in FIG. 7. In some embodiments, as described herein, the insurance medical liaison may comprise a computing device, software, artificial intelligence and/or a virtual representation of a nurse operable to report a claim. For example, the insurance medical liaison may comprise an apparatus with which an injured worker may interface to provide information about an injury and the apparatus may be programmed to contact the claim reporting system 170 to report the WC claim of the injury (e.g., via the Internet or another appropriate network).

According to some embodiments, the method 400 may further comprise receiving information indicative of an evaluation, by the insurance medical liaison who is providing a report of the claim, of at least one of the work-related injury and the injured worker (404). For example, the insurance medical liaison (e.g., a nurse) may interview the worker and obtain information from the worker such as contact information of the worker, a description of how and when the injury occurred, current medications or medical treatments the injured worker is taking (for the subject injury or another condition), current limitations on the injured worker's physical abilities (whether from the subject injury or another condition), medical history, names of witnesses to the injury, whether the injured worker has a good comprehension of the English language or requires a translator, whether the injured worker requested an attorney. Any and all of this or other relevant information may be obtained by the insurance medical liaison by interfacing with the injured worker at the location of the injury or the location of a medical care facility (e.g., a clinic) to which the injured worker reported to have the injury examined by a treating medical professional. Applicants have recognized that having the insurance medical liaison interface directly with the injured worker at such a time and location may provide valuable information that might otherwise not be adequately captured under existing systems (e.g., having a claim professional contact the injured worker several hours or days later may comprise the memory and/or ability or willingness of the injured worker to provide adequate information). Thus, Applicants have recognized that there are significant benefits to having the same insurance medical liaison who directly interfaces with the injured worker at such a time and location provide both the initial report of the WC claim and the information obtained from the injured worker during an initial contact with the injured worker.

In some embodiments, the information received in 404 may comprise observations and/or personal opinions about the injured worker and/or the injury that are that of the insurance medical liaison. For example, the insurance medical liaison may observe that the injured worker appeared nervous or evasive when answering questions about his medical history. In another example, the insurance medical liaison may observe that the injured worker appeared very anxious about any potential loss of income due to the injury and an extreme willingness to consider modified duties that may be performed while injured.

According to some embodiments, the method 400 may further comprise establishing a new record in the claim reporting system for the workers compensation claim based on the report of the WC claim and the information descriptive received from the insurance medical liaison (406). Thus, a WC claim may be established in the claim reporting system 170 based on an initial report of the WC claim received from a claim professional who interfaced with the injured worker and obtained information from the injured worker at a time close to the injury, close the time the injured worker reported the injury to an employer and was directed to a medical care facility and/or upon the injured worker arriving at the medical care facility (e.g., within twenty-four hours of any of these events occurring).

Figure 5:
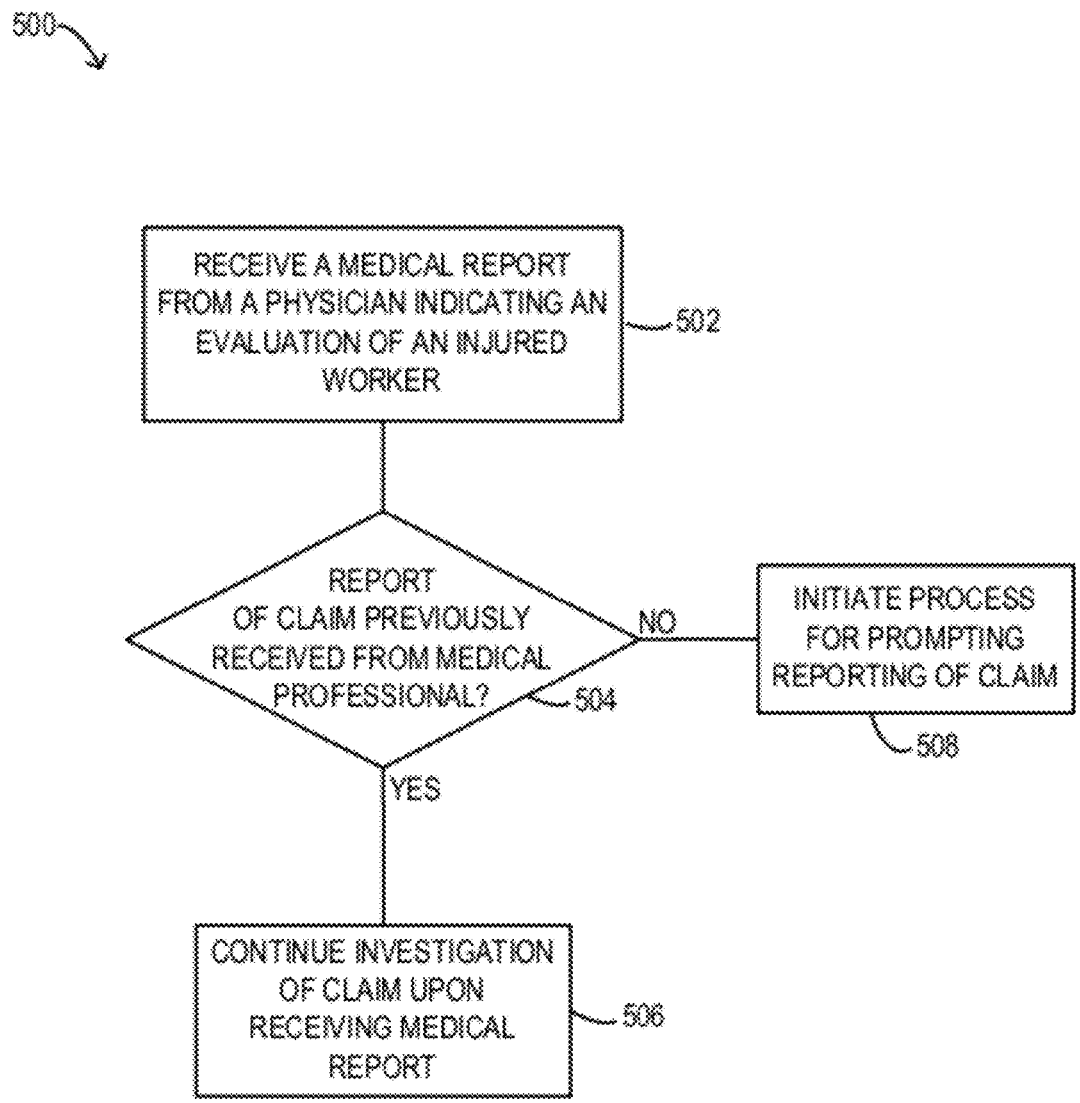
FIG. 5 is a flowchart of a method according to some embodiments of the present disclosure.

Referring now to FIG. 5, a flow diagram of a method 500 according to some embodiments is shown. The method 500 may, for example, be performed by or on behalf of an insurance provider, a claim professional, a insurance medical liaison, a medical care facility, an employer and/or an insured person or other user. For purposes of brevity, the method 500 will be described herein as being performed by a computer (e.g., a client computer operated by a claim professional) on behalf of an insurance company. It should be noted that although some of the steps of method 500 may be described herein as being performed by a client computer while other steps are described herein as being performed by another computing device, any and all of the steps may be performed by a single computing device which may be a client computer, server computer, third-party data device or another computing device. Further any steps described herein as being performed by a particular computing device may be performed by a human or another computing device as appropriate.

According to some embodiments, the method 500 may comprise receiving a medical report from a treating medical professional, the medical report indicating an evaluation of an injury of an injured worker (502). As described herein, typically when an injured worker reports to a medical care facility he or she is examined by a treating medical professional, who generates and submits a report of the examination to an insurance provider of an employer for which the injured worker was working while injured or otherwise provides a medical status of the injured worker to the insurance provider. In some embodiments, 502 may comprise a first indication of the injured worker's medical status as received by the insurance provider and may thus be considered an initial medical status. The report of this first examination of a WC claim-related injury may take the form of a formal written communication (in which case it is typically referred to as a Doctor's First Report or other similar name) or a more informal communication (e.g., a verbal communication between (i) the insurance medical liaison and/or acclaim professional affiliated with the insurance provider and (ii) the treating medical professional who examined the injured worker; or notes written by the treating medical professional in the injured worker's medical chart). Although the treating medical professional (or another treating medical professional) may subsequently examine or re-examine the injured worker during the course of their treatment and rehabilitation from the injury, it is the report of a medical status as determined by the treating medical professional that is important to a determination of compensability for a WC claim. The medical report may include information such as vital measurements (e.g., blood pressure, temperature, weight) of the injured worker taken during the examination, a description of the injury, results of any diagnostic tests taken during or related to the examination (e.g., a summary of the findings of an X-Ray or CAT scan), a diagnosis, recommended treatment(s) and any prescriptions provided to the injured worker during the injured worker's visit with the treating medical professional. A Doctor's First Report or other medical report from the treating medical professional may be received electronically (e.g., via electronic mail or download over the Internet), verbally through a discussion with the treating medical professional, by viewing the treating medical professional's notes or in hard copy form (e.g., via a postal mailing, in the form of a report printed on paper). The medical report may include information identifying the injured worker and other information which would allow an insurance provider to match it to an employer, employer's WC policy and/or previously reported claim. For example, the medical report may include the injured worker's name, address, social security number, employer, date of injury and in some circumstances even a claim number (e.g., if, in accordance with embodiments described herein, a insurance medical liaison on site at the medical care facility reported the WC claim during the injured worker's visit to the medical care facility and obtained a claim number, the insurance medical liaison may provide the claim number to the treating medical professional for use on the medical report).

In some embodiments, 502 may comprise an employee of an insurance provider receiving the medical report and entering an indication of it into a database associated with an insurance provider. In another embodiment, 502 may comprise software identifying a medical report and storing an electronic copy of the medical report in a memory of a computing device.

In accordance with some embodiments, the method 500 further comprises determining whether a report of a claim for the injury has previously been received from a insurance medical liaison distinct from the treating medical professional who provided the medical report (504). As described herein, in previously available systems, a WC claim was typically reported by an employer of the injured worker and many times was still not yet reported to the insurance provided upon a medical report of the injury being received from a treating medical professional who examined the injured worker. Thus, a search of a claims database (e.g., a search of a database residing in a claim reporting system 170 and/or a claim management system 180) may be performed in 502 to determine whether a claim for the injury has previously been reported and, if it has, whether the report was received from a insurance medical liaison (e.g., a nurse) affiliated with the insurance provider. Such a search may be performed, for example, based on information included in the medical report (e.g., injured worker's name and address, employer name, date of injury).

In some embodiments, 504 may comprise an employee of the insurance provider performing a search of a database (e.g., using an interface of a client device). In some embodiments, 504 may comprise a program running on a computing device determining identifying information in the medical report (e.g., by accessing particular fields or portions in the medical report) and initiating and performing a search of a database for a previously reported claim that includes the identifying information.

In accordance with some embodiments, the method 500 may further comprise continuing, prior to a report of the claim by either an employer of the injured worker or the injured worker and if a report of the claim has previously been received from the insurance medical liaison, an investigation of the claim by a claim professional based on the medical report (506). As described herein, once a medical report (e.g., a Doctor's First Report) is received by an insurance provider, a claim professional may be prompted or assigned to perform or continue to perform an evaluation of a compensability of a WC claim based on information contained in the Doctor's First Report. As described herein, in some embodiments receiving a Doctor's First Report may comprise receiving a medical report directly or indirectly from a treating medical professional and in some embodiments comprises a insurance medical liaison obtaining the medical report from the treating medical professional while at the medical facility at which the injured worker was examined (e.g., by talking to the treating medical professional and/or reading the treating medical professional's notes in the medical chart of the injured worker) and reporting the obtained information to the insurance provider. Thus, a medical report or Doctor's First Report need not be a formal written communication from the treating medical professional.

Typically, a compensability evaluation cannot be significantly moved forward or finalized until the claim of the WC claim that is the subject of the Doctor's First Report is reported to the insurance provider. In a typical WC claim management system, a compensability determination may be formally initiated once a claim is reported by an employer even before a Doctor's First Report is reported to the insurance provider (e.g., an initial contact with the injured worker may be made by a claim professional once the claim is reported but prior to the Doctor's First Report being received). This allows for efficient processing and finalization of the WC claim once the Doctor's First report has been received since some investigation and information gathering with respect to the WC claim may have already been completed prior to the Doctor's First Report being received. However, in the very many cases in which the employer does not report the WC claim, the receipt of the Doctor's First Report is the first formal indication that the insurance provider may have of the WC claim. In such cases, a claim specialist may contact the employer upon receiving the Doctor's First Report and request the employer formally report the claim. Even after such a request, however, many times the employer still delays (e.g., in many cases for months) the reporting of the claim due to the inconvenience and time it may take to answer the many questions required to be answered by the employer when reporting the claim. Because a claim professional is not authorized to significantly progress through or finalize a compensability determination until the WC claim has formally been reported into the system, such a delay causes the insurance company to delay making compensability determinations.

Figure 10:
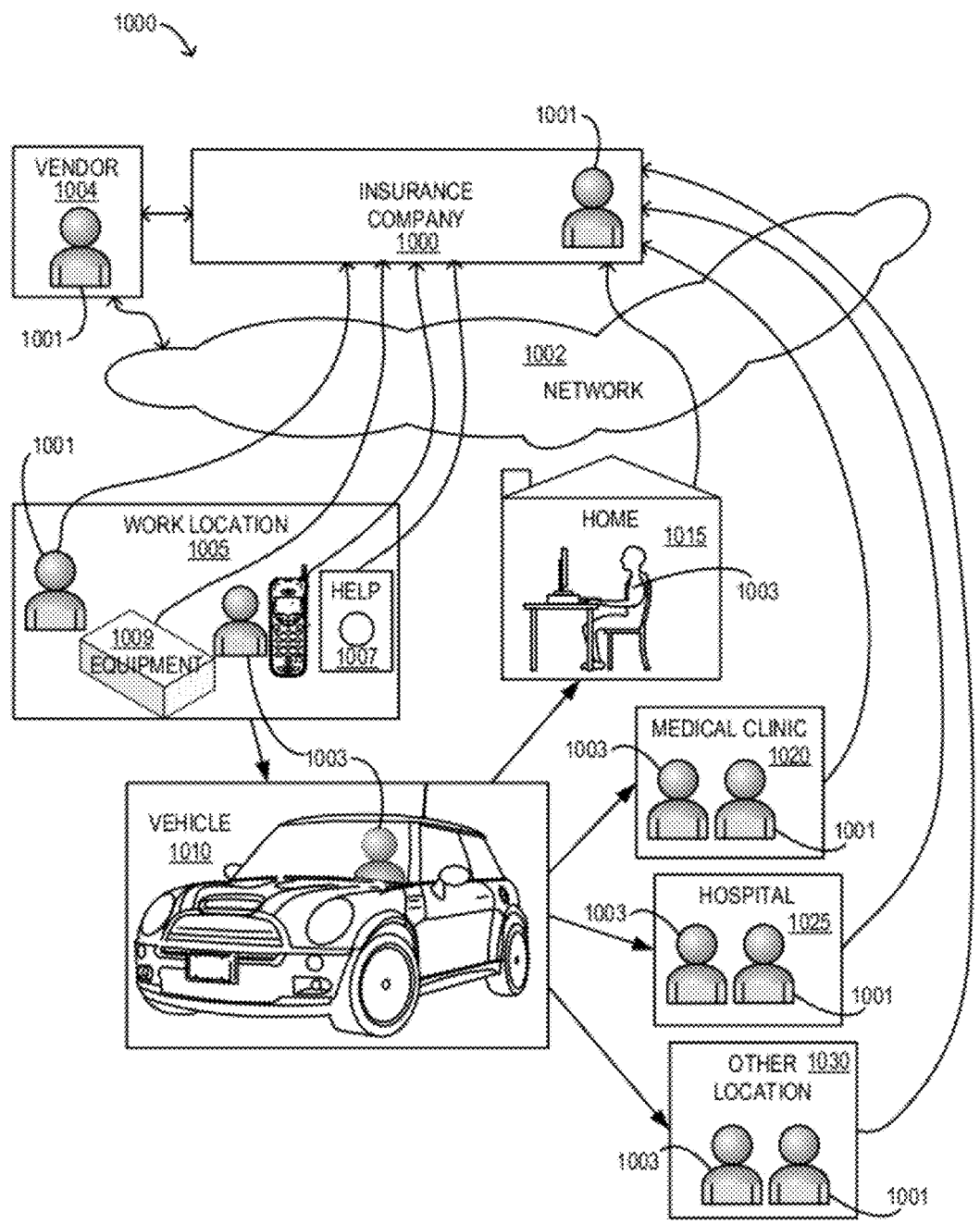
FIG. 10 is a functional block diagram depicting an overview of various entities, locations and communications which may be involved in implementing one or more embodiments described in the present disclosure.

Applicants have recognized that such delays and inefficiencies in making a final compensability determination may be significantly alleviated by placing an insurance medical liaison at a medical care facility (or other location) at which an injured worker may first have an injury examined and/or at a location at which an injury may occur (e.g., in a vehicle or other apparatus operated by a worker or at a place of business or work site). In some embodiments (e.g., some of which are illustrated in FIG. 10, described hereinafter), the injured worker may interact with the insurance medical liaison on the way to the clinic, e.g., through a cell phone, smart phone, PDA, lap top computer, or other portable device that can communicate with the worker before the worker reaches the clinic, e.g., when in route to the clinic, while still at the work site, when the worker is at home, or at any other location after the injury has occurred. In some embodiments, there may be an interface to the insurance medical liaison at a job site, place of work or business at which an injury occurs. In that case, the insurance medical liaison may be located in-person in an office/room or other location within the work site or virtually (as described herein with respect to the clinic). Further, in some embodiments, there may be call buttons (or other alerting devices) located throughout a work site (e.g., throughout a factory) and/or near certain locations or items at a work site (e.g., near certain machines or equipment) operable to be actuated or activate by a worker or a person near the worker, which may, when actuated or activated, cause an interaction with the insurance medical liaison (or with another person or device that contacts the insurance medical liaison). In some embodiments, certain locations, machines or equipment may be equipped with sensors or other devices, software and/or intelligence that can sense when the worker operating (or near to) the machine has (or may have) become injured and automatically initiate an interaction with the worker to determine whether communication with the insurance medical liaison is necessary, e.g., asking the worker (or another person) whether the worker is injured and, if so, automatically connecting the worker with the medical liaison through any of the technologies discussed herein. Thus, embodiments described herein provide an alternate mechanism for an insurance provider to receive the information desired (i.e., a reporting of a WC claim) for a final determination of the compensability of a WC claim.

In some embodiments, the block 506 (FIG. 5) may comprise software causing the output of a message or other indication to a person, apparatus, system or program. The message or other indication may inform the person, apparatus, system or program of the authorization and thereby cause progression of the investigation. In another embodiment, 506 may comprise an employee of an insurance provider performing the authorization and inputting an indication of the authorization into a memory, program, apparatus or user interface. In some embodiments, 506 may comprise one or more fields of a database or user interface being made active or available for input of information. In some embodiments, 506 may comprise causing a program to perform certain functions (e.g., causing a program for calculating the cost of a claim to perform the cost calculation).

F. Example System

In accordance with some embodiments, an example system may comprise an insurance provider embedding a nurse (the nurse serving as the insurance medical liaison described herein) in a clinic authorized by one or more employers for their WC claims. The nurse may thus be trained and available to interface with the injured worker when the injured worker first reports to the clinic for an evaluation of the injury, report the claim to the insurance provider along with any observations or other information obtained by the nurse as a result of the interfacing with the injured worker. In some embodiments, the nurse may further be trained and available to work with a representative of the insurance provider to provide a preliminary determination of benefits that the injured worker may qualify for, guide the injured worker as to the appropriate medical treatment that may be covered (or more likely to be covered) by the WC policy of the injured worker's employer, provide reassurance and information to the injured worker as to the process for working with the insurance provider to determine the compensability of the injury and follow-up with the injured worker after the initial visit to the clinic to further aid the injured worker through the process and motivate the injured worker to follow the prescribed medical treatment. In some embodiments, the nurse may be further trained and available to contact the employer of the injured worker to obtain further information useful in determining the benefits that may be due to the worker, facilitate a shortened RTW time frame and/or determine modified duties the injured worker may perform while injured.

Figure 6A:
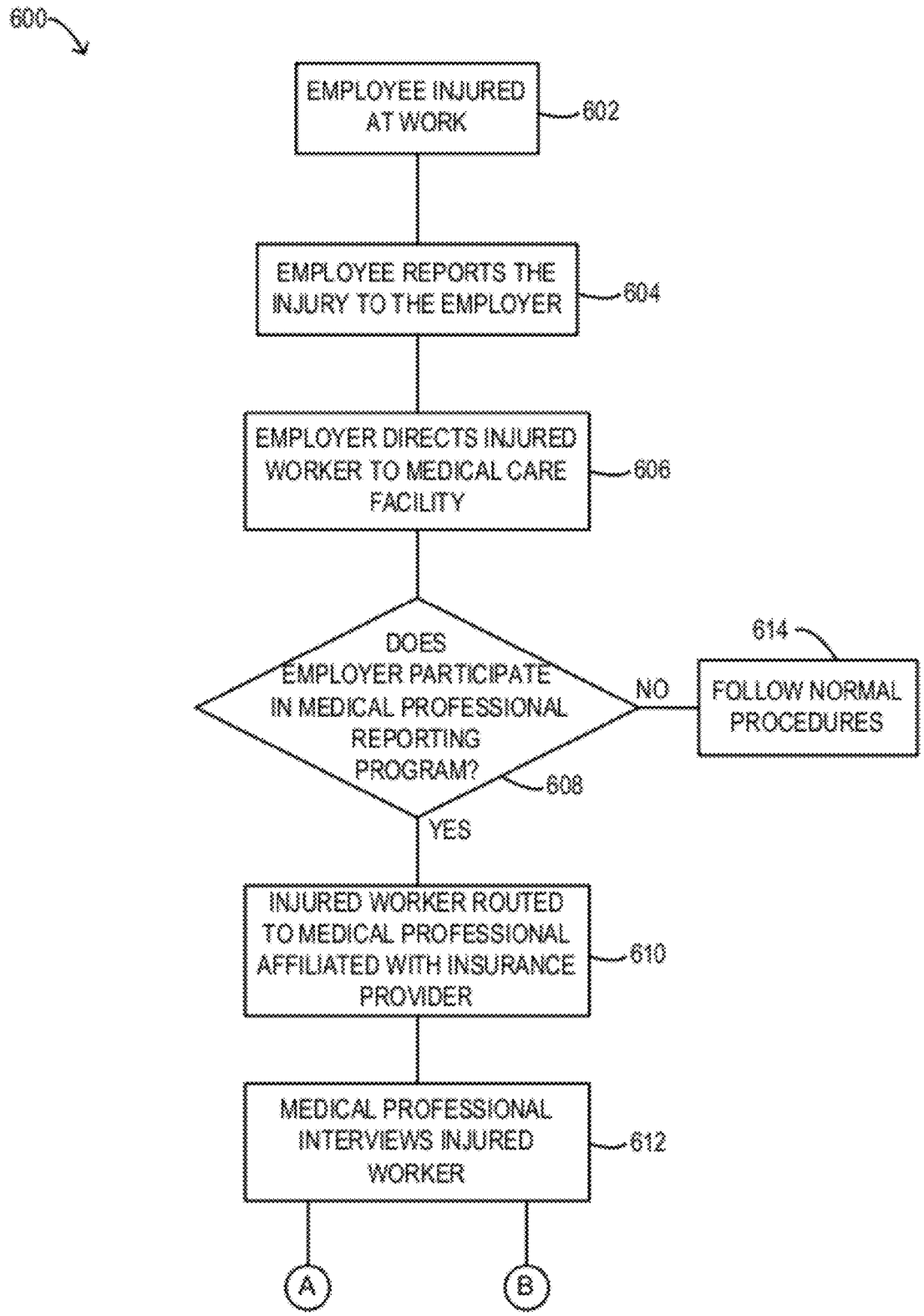
FIG. 6A is a flowchart of a first part of a method according to some embodiments of the present disclosure.
Figure 6B:
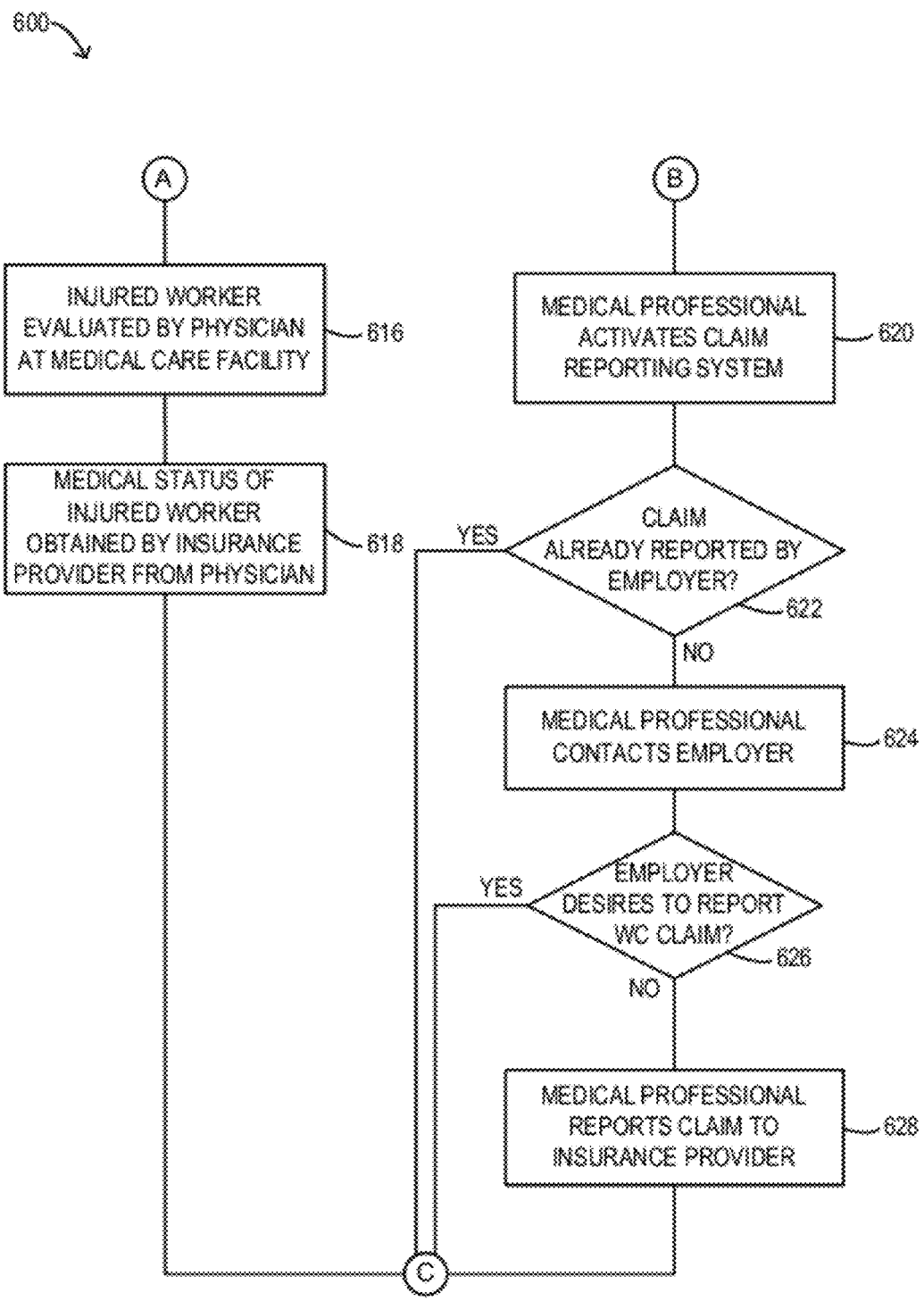
FIG. 6B is a flowchart of a second part of a method according to some embodiments of the present disclosure.
Figure 6C:
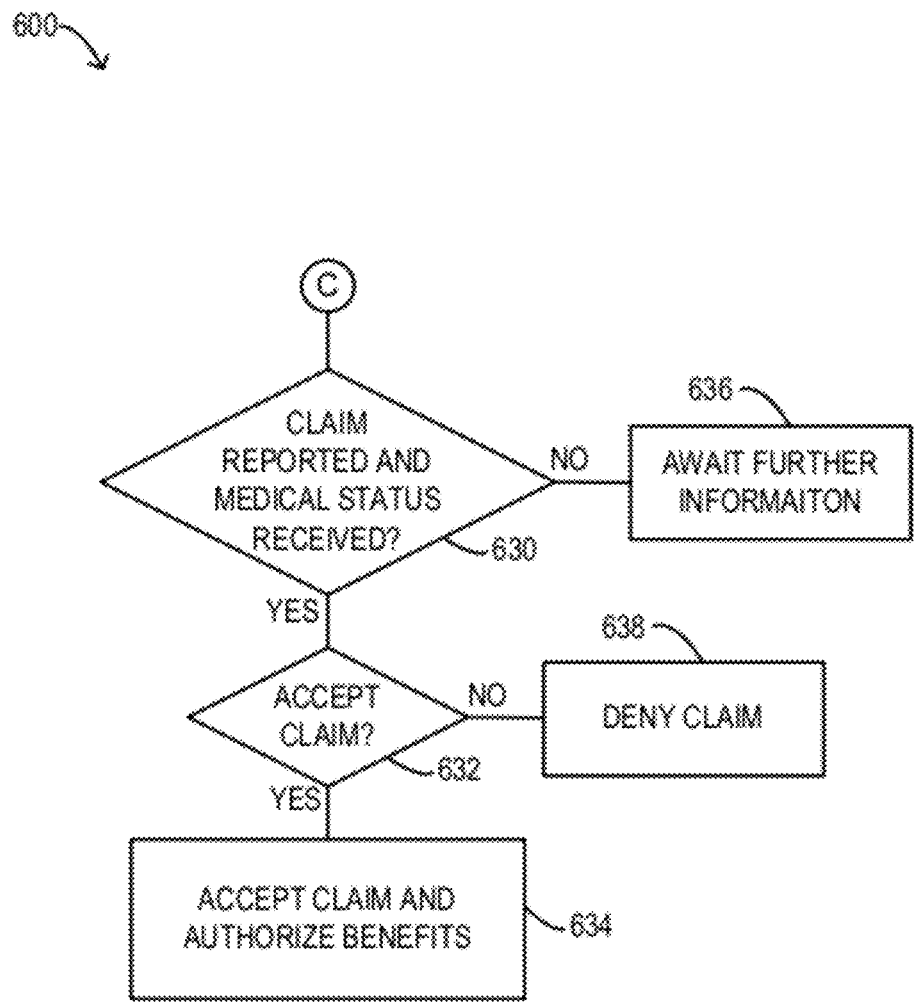
FIG. 6C is a flowchart of a third part of a method according to some embodiments of the present disclosure.

Referencing again the Figures, FIG. 6A, FIG. 6B and FIG. 6C together comprise a flow diagram of an example method 600 corresponding to the example system described above. The method 600 may, for example, be performed by or on behalf of an insurance provider, a claim professional, a insurance medical liaison, a medical care facility, an employer and/or an insured person or other user. For purposes of brevity, the method 600 will be described herein as being performed by a computer (e.g., a client computer operated by a claim professional) on behalf of an insurance company. It should be noted that although some of the steps of method 600 may be described herein as being performed by a client computer while other steps are described herein as being performed by another computing device, any and all of the steps may be performed by a single computing device which may be a client computer, server computer, third-party data device or another computing device. Further any steps described herein as being performed by a particular computing device may be performed by a human or another computing device as appropriate.

The method 600 may comprise an employee being injured at work (602). Being injured at work may comprise being injured while performing duties for an employer or activities within the scope of employment. An injury may, but need not, occur at a place of the employer's business, at a work site or operating an apparatus affiliated with an employer. The employee may then report the injury to the employer (604). It should be noted that, in some embodiments, significant time may pass between 602 and 604 (e.g., days, weeks or even months) while in other embodiments (e.g., particularly when the injury is severe), 602 and may occur within minutes or hours of one another and, in some embodiments, even simultaneously.

The employer may, upon learning of the injury, direct the injured worker to a clinic previously designated by the employer for the employer's WC claims 606). Some employers may also (e.g., shortly upon learning of the injury or directing the employee to the clinic), report the injury to the insurance provider holding the WC policy of the employer. As described herein, however, many employers simply fail to report the claim in a timely manner. For example, many employers do not report a WC claim for weeks or even months, and sometimes not until prompted to do so by the insurance provider once the insurance provider receives a Doctor's First Report that indicates an injury. Thus, in some embodiments reporting of a WC claim by an employer to the insurance provider may not occur until weeks or months after 604. In accordance with embodiments described herein, an employer reporting the claim to the insurance provider may not occur at all (e.g., if a nurse or other insurance medical liaison reports the claim to the insurance provider, the employer need not report the claim at all (although the employer may still be contacted by the insurance provider during the course of an investigation of the WC claim)).

Once the injured worker reports to the clinic, the staff of the clinic determine whether the employer of the injured worker participates in a insurance medical liaison reporting program as described herein (608). For example, the clinic staff may determine whether the insurance provider of the injured worker's employer has a nurse embedded in the clinic. As described herein, a particular insurance provider may provide a program via which a WC claim may be reported to the insurance provider via a insurance medical liaison (e.g., in lieu of being reported via an employer). In some embodiments, any employer who subscribes to WC insurance from such an insurance provider may be deemed to participate in such a insurance medical liaison reporting program and thus 608 may simply comprise determining whether the employer's insurance provider provides such a insurance medical liaison reporting program. In other embodiments, even when an insurance provider provides such a insurance medical liaison reporting mechanism, an employer may be provided the option to either participate in the program or not. Thus, in some embodiments, even if the employer's insurance provider provides a insurance medical liaison reporting program (e.g., has a nurse embedded in the clinic), 608 may involve a further query as to whether the particular employer of the injured worker has chosen to participate in the program. The staff of the clinic may take some preliminary information from the injured worker in order to make this determination (e.g., find out who the injured worker's employer is). If the insurance provider of the injured worker's employer does not participate in a insurance medical liaison reporting program, method 600 proceeds to 614, wherein the injured worker is evaluated in the normal course. If the insurance provider of the injured worker's employer does participate in a insurance medical liaison reporting program (e.g., has a nurse embedded in the clinic), the injured worker will be routed to the appropriate insurance medical liaison (e.g., nurse) (610). It should be noted that the routing of the injured worker to the nurse or other insurance medical liaison and the remainder of the steps of method 600 are performed in such a way as to interfere as little as possible with the evaluation of the injured worker by the clinic staff. In 612, the nurse or other insurance medical liaison interviews the injured worker (e.g., while the injured worker is waiting to be seen by a treating medical professional of the clinic). The interview may comprise, for example, questioning the injured worker about how the injury occurred, the extent of the injury, demographic and medical history information about the injured worker and any particular concerns the injured worker may have with respect to the injury and/or the compensability of the injury.

The method 600 then diverges into two simultaneous tracks, A and B. In track A, the injured worker is evaluated by a treating medical professional of the clinic (616). For example, the treating medical professional (e.g., a physician and/or nurse) of the clinic may examine the injury, question the injured worker, perform diagnostic tests on the injured worker and determine a diagnosis and treatment options for the injured worker. Optionally, in some embodiments, a medical status of the injured worker (e.g., as determined by the treating medical professional) may be obtained by the insurance medical liaison (617). It should be noted that activities of an insurance medical liaison (some or all of which, in some embodiments, may be performed while the injured worker is being evaluated by the treating medical professional) are described in more detail with respect to track B of FIG. 6B). It should further be noted that the mere reference to 617 as being "optional" does not in any manner imply that other functions, activities, steps or elements of the figures described herein are not optional. In one embodiment, the insurance medical liaison obtains a medical status of the injured worker by virtue of the injured worker providing the insurance medical liaison a medical chart, results of the evaluation by the treating medical professional or information otherwise obtained by the injured worker via the evaluation by the treating medical professional. For example, the injured worker may provide such information to the insurance medical liaison after being seen by the treating medical professional. Upon obtaining such information in 617, in some embodiments the insurance medical liaison may review and update information determined, obtained, inferred or collected previously at 612 (FIG. 6A). Such updated information may in turn, in some embodiments, be conveyed to the employer of the injured worker and/or the insurance company in track B of FIG. 6B (e.g., at 624 and 628, respectively).

In 618, a medical status of the injured worker is obtained from the treating medical professional who examined the injured worker at the clinic. The medical status may include, for example, a diagnosis of the injury and a recommended treatment for the injury (among other things). In some embodiments, the treating medical professional issues a Doctor's First Report that summarizes the results of the examination and the medical treatment options, which Doctor's First Report is provided to the insurance provider of the injured worker's employer as a formal written communication in 618. In such embodiments, it should be noted that some time (e.g., weeks) may pass between 616 and 618. In other embodiments, 618 may simply comprise a verbal or other informal communication between the treating medical professional and the insurance medical liaison, or the insurance medical liaison obtaining the treating medical professional's notes from the injured worker's medical chart, which informally obtained information is provided to the insurance provider. In such informal communication embodiments, receiving the medical status may simply comprise receiving information regarding a medical status of the injured worker as determined by the treating medical professional and may be obtained the day of (or shortly thereafter) the injured worker is examined by the treating medical professional at the medical clinic. In some embodiments, a medical status received in 618 may comprise an initial medical status, that is first indication of the injured worker's medical status.

In track B, the nurse affiliated with the insurance provider (or the insurance medical liaison) may report the WC claim into the insurance provider's system or encourage the employer of the injured worker to do so. For example, the nurse may utilize a desktop computer or mobile device (e.g., a dedicated medical device for communicating with the insurance provider's claim reporting system) to activate or pull up the insurance provider's claim reporting system (620). The nurse may the determine whether the WC claim has already been reported by the employer of the injured worker (622). For example, the nurse may input information such as the injured worker's name and/or social security number, the employer's name or other identifiers and a date of the injury. If it is determined that the WC claim has already been reported into the system, the method 600 continues to part C, which is described with respect to FIG. C. Otherwise, the method 600 continues to 624, wherein the nurse contacts the injured worker's employer to inform the employer that the injured worker has reported to the medical clinic for an examination of the injury and to determine whether the employer prefers to report the WC claim or whether the employer is agreeable to having the nurse report the WC claim to the insurance provider. In some embodiments, 624 may comprise, for example, the nurse explaining to the employer (or a representative thereof) that the injured worker is at the medical clinic having his injury evaluated and that the injury is currently being treated as a WC claim and should be promptly reported to the insurance provider such that a compensability determination may proceed quickly and efficiently.

In 626, it is determined whether the employer prefers to report the WC claim. For example, some employers have a staff member designated for such functions and may prefer to have the staff member report the claim. If the employer prefers to report the claim, the method 600 continues to part C of the process, which is described with respect to FIG. 6C. Otherwise, the method continues to 628, wherein the nurse reports the WC claim to the insurance provider. For example, the nurse may utilize an interface such as user interface 700 as illustrated in FIG. 7 to input information about the WC claim and cause the claim reporting system (e.g., claim reporting system 170 of FIG. 1B) to generate a unique claim number for the WC claim and/or notify a claim professional about the claim. In some embodiments, process 600 (e.g., at 626) may further comprise the nurse inputting information gathered via the nurse's interaction with the injured worker (e.g., observations about the demeanor of the injured worker, answers provided by the injured worker to the nurse, information told to the injured worker by the nurse, vital measurements or other diagnostic information obtained by the nurse). For example, in some embodiments the nurse may obtain digital photographs and/or video of the injury when interacting with the injured worker and upload these as part of the process of reporting the claim. Once the nurse reports the WC claim, the method 600 continues to part C of method 600 (described with respect to FIG. 6C). It should be noted that 624 and 626 may be omitted in some embodiments. For example, in some embodiments the nurse automatically reports all WC claims that have not already been reported by the employer and does not contact the employer to provide them an option of reporting the WC claim themselves once the injured worker reports to the medical care facility.

It should be noted that the interaction between the nurse and the injured worker may comprise more than one session or time frame, which may be interspersed with other activities undertaken by the injured worker while at the clinic. For example, the nurse may ask the injured worker some preliminary questions and then the treating medical professional of the clinic may become available to examine the injured worker, in which case staff of the clinic may retrieve the injured worker from the nurse for some time. During this time, the nurse may take the opportunity to begin reporting the claim and/or contact the employer of the injured worker. In some circumstances, the injured worker may request an attorney and/or translator prior to further discussing the injury with the nurse. Thus, in some embodiments the method 600 may comprise the nurse contacting a translator to aid with further discussions with the injured worker (the nurse may provide an indication of such a request and/or aid when reporting the claim). In some embodiments, the injured worker may indicate that he is (or desired to be) represented by an attorney with respect to the WC claim. In such embodiments, the nurse may inform the injured worker that such an attorney's permission needs to be obtained prior to further questioning the injured worker about the injury and/or inquire about the injured worker's reasons for requesting an attorney. The nurse may further indicate the injured worker's desire for an attorney to the insurance provider (e.g., the nurse may make a note of this when reporting or updating the claim in the insurance provider claim reporting or claim management system).

In some embodiments, during or after the injured worker's visit to the clinic, the nurse may contact the employer of the injured worker to obtain information about the injury, other information relevant to reporting the claim and/or discuss and/or reach agreement on modified duties the injured worker may perform for the employer (which reaching of agreement may include obtaining the treating treating medical professional's authorization and agreement). In some circumstances, it may be appropriate for the nurse to participate in a discussion with both the injured worker and the employer (e.g., by placing the employer on speaker phone while the injured worker is in the room) for one or more purposes.

In some embodiments, the nurse may further contact a claim professional of the insurance provider to discuss the compensability determination (e.g., obtain a determination or preliminary determination as to one or more benefits the injured worker may qualify for). Thus, the nurse may be able to provide some helpful information to the worker while the worker is still at the clinic with respect to the benefits, thus possibly alleviating the injured worker's anxiety. In some embodiments, the nurse may further be able to provide guidance and recommendations to the injured worker as to covered (e.g., in network) medical treatments (e.g., pharmacies, treating medical professionals, therapists, medications), thereby possibly reducing the injured worker's out-of-pocket costs with respect to the injury. The nurse may further be tasked with following-up with the injured worker after the initial visit to the clinic (e.g., to determine whether the injured worker's condition is improving, encouraging the injured worker to follow recommended medical treatments and encouraging the injured worker to arrive for scheduled follow-up appointments).

Turning now to part C of method 600, 630 comprises determining (e.g., by a claim managements system 180) whether both the reporting of a claim and a medical status (e.g., an initial medical status) of the injury (e.g., via an informal communication from the treating medical professional or a formal written Doctor's First Report) have been received by the insurance provider. If both have been received, the method 600 continues to 632, wherein it is determine whether the WC claim should be accepted (e.g., one or more benefits paid out or otherwise provided with respect to the claim). For example, a software program and/or claim professional may investigate the WC claim (e.g., review information provided by the treating medical professional, contact the employee, determine the scope of the WC policy and any state requirements or limitations, conduct a follow-up telephone conversation with the injured worker) and make a final determination as to the benefits the injured worker qualifies for under the relevant WC policy. In some embodiments, 632 may comprise comparing information provided by a nurse affiliated with the insurance provider with information provided in the Doctor's First Report or other informal communication from the treating medical professional which indicates a medical status of the injured worker, to determine whether any discrepancies exist and/or to gather a more complete picture of the circumstances of the injury.

If the claim is not deemed to be acceptable in 632, the claim is denied in 638. For example, the employer and/or injured worker may be informed (e.g., via a postal mailing) of the denial and reasons therefor. If the claim is deemed to be acceptable, the claim is accepted and the benefits authorized in 630. For example, the employer and/or injured worker may be informed of the benefits and a check for an appropriate monetary amount may be issued to the employer and/or injured worker and medical costs may be paid to the medical provider (e.g., clinic and/or treating medical professional who treated the injured worker).

It should be noted that although the method 600 was described in the context of a live nurse being embedded in a clinic, in accordance with some embodiments a virtual nurse and/or kiosk may be located by or on behalf of an insurance provided at a clinic for many or all of the same purposes and functions as described with respect to the live nurse. For example, a kiosk featuring a virtual nurse and/or video feed to a live nurse may be placed at a clinic, thus allowing the insured worker to interface with the kiosk while at the clinic and facilitating the reporting of a WC claim to an insurance provider without awaiting the reporting of the claim by the employer of the injured worker.

Turning now to FIG. 7, an example user interface 700 is illustrated. The example user interface 700 may be utilized (e.g., by a nurse or other insurance medical liaison affiliated with an insurance provider, who is embedded in a clinic or other location visited by the injured worker) to report a claim and provide information about the claim based on the nurse's interactions with the injured worker. The user interface 700 may comprise, for example, user interface to a claim reporting system 170, accessed by the nurse via the Internet or other connection to a proprietary claim reporting system.

Turning now to FIG. 8, illustrated therein is an example user interface 800. The user interface 800 may be utilized, for example, by a claim professional and/or software program to determine information reported when reporting a WC claim, including whether the WC claim was reported by a nurse or other insurance medical liaison affiliated with the insurance provider and to obtain other information about the reporting of the claim, such as the date and time at which the claim was reported and the date of initial contact with the injured worker and an indication of who initially contacted the injured worker with respect to the claim.

Figure 9:
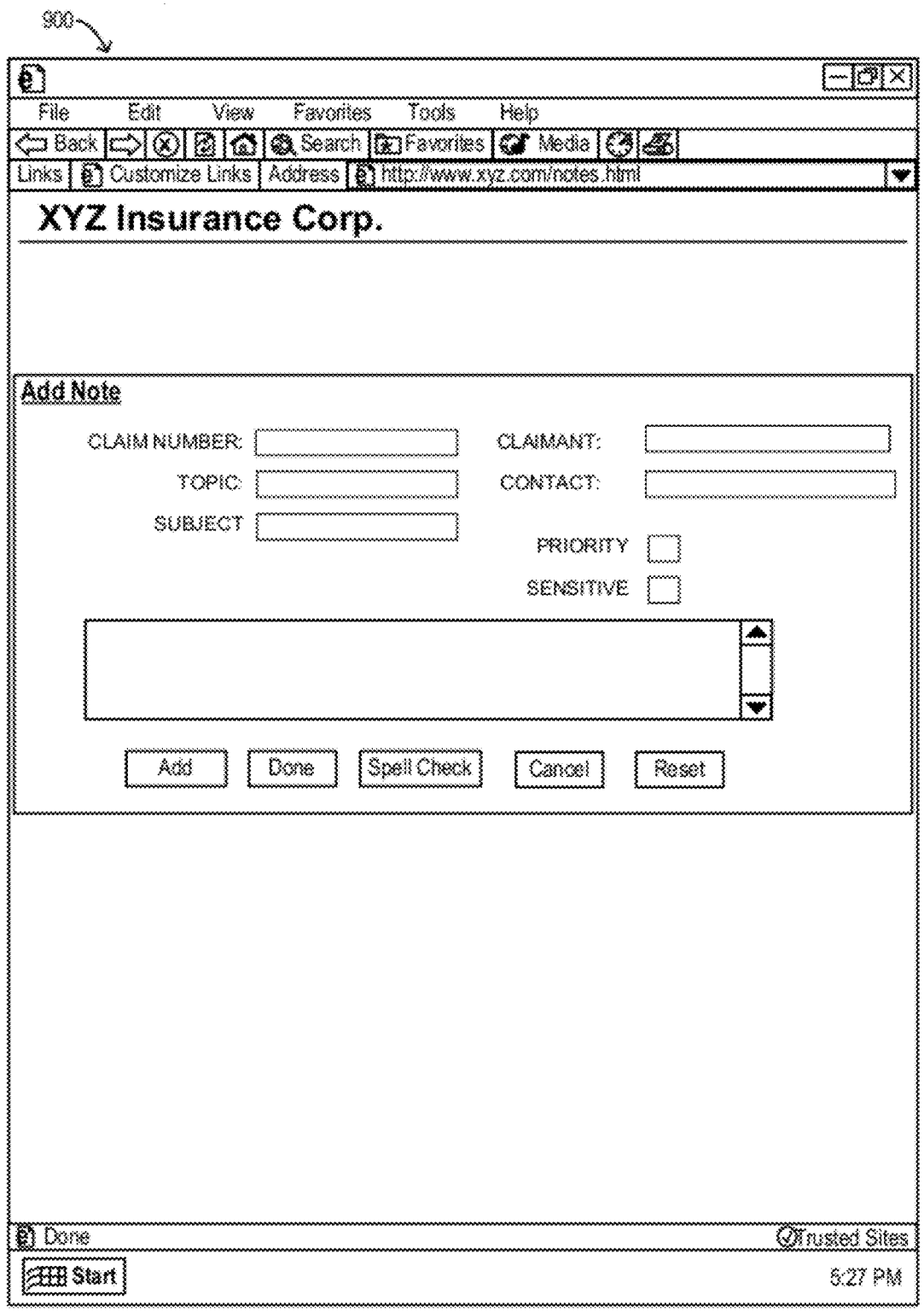
FIG. 9 depicts an example user interface according to some embodiments of the present disclosure.

Turning now to FIG. 9, illustrated therein is an example user interface 900. The user interface 900 may be utilized, for example, by a nurse or other insurance medical liaison affiliated with an insurance provider, to input one or more notes about a WC claim into a WC claim management system 180 and/or a claim reporting system 170. As described herein, in some embodiments a claim may have been reported by an employer prior to a medial professional attempting to report the claim. In such embodiments, rather than reporting a claim, the insurance medical liaison may retrieve the existing record of the claim and add one or more notes with respect to their own contact or interactions with the injured worker (e.g., a nurse embedded in a clinic may use the user interface 900 to enter observations about the injured worker and/or the injury and/or answers provided by the injured worker obtained while interviewing and evaluating the injured worker). In some embodiments, the nurse or other insurance medical liaison may utilize the user interface 900 to add notes to a record of the WC claim after the injured worker's initial visit to the clinic (e.g., based on a follow-up conversation with the injured worker after the injured worker leaves the clinic).

It should be noted that any or all of the information illustrated in FIG. 7, FIG. 8 and/or FIG. 9 may be stored in a memory such as a database. For example, some or all of the information may be stored in a WC claim data 252, such as that illustrated in table 300 of FIG. 3. It should further be noted that the format and information in these figures is for illustrative and non-limiting purposes only. It should further be noted that any of the information described herein as being provided by a insurance medical liaison via one of the user interfaces 700, 800 and/or 900 may alternatively be provided directly by a software program of an apparatus serving as a insurance medical liaison. For example, as described herein, in some embodiments a insurance medical liaison may comprise an apparatus and/or component at a job site, business or other location at which an injured worker is injured. Such an apparatus and/or component may be operable to sense an injury or potential injury and obtain information from the injured worker about the injury (e.g., confirm injury, obtain description of the injury and/or injured worker's condition, time of injury, etc.). In such embodiments, the apparatus and/or component may be operable to provide the obtained information to a claim reporting system 170 (e.g., by transmitting the information, including any audio and/or video files to the claim reporting system 170).

Referring now to FIG. 10, illustrated therein is a functional block diagram depicting various entities, locations and communications which may be implemented according to various embodiments described herein. As described herein, an injured worker or injured person 1003 (illustrated in various locations in FIG. 10) may communicate (in-person or via a network or otherwise electronically) with an insurance medical liaison 1001 while the injured worker 1003 is at one or more locations. For example, the injured worker 1003 may communicate with the insurance medical liaison 1001 while (i) at a work site 1005 (indoor or outdoor) where the injury occurred, (ii) in a transportation vehicle 1010 (e.g., a vehicle in which the injured worker 1003 was injured or a vehicle transporting the injured worker after the injury occurs), (iii) at the injured worker's home 1015, (iv) at a medical clinic 1020, (v) at a hospital 1025 or any other location or facility 1030 (e.g., a department store, retail store, pharmacy, or any other location or facility). The vehicle may be a land vehicle (such as a car, bus, train, truck, or any other land vehicle), a water vehicle (such as a boat, ship, jet ski, hydroplane, or any other water vehicle), and/or an air vehicle (such as an airplane, helicopter, or any other air vehicle). It should be noted that the insurance medical liaison 1001 may also be located at any of the locations 1005-1030 (e.g., at a time the injured worker 1003 is located at the same location or while the injured worker 1003 is located at a different location than the insurance medical liaison 1001). It should further be noted that, in some embodiments, any or all of the information provided by the injured worker 1003 to the insurance medical liaison 1001 may be provided to an insurance provider 1000. It should further be noted that, in some embodiments, information may be provided, uploaded, exchanged, transmitted and/or received between or among the various locations 1005-1030 and/or the insurance company 1000 via a network 1002. The network 1002 may comprise, for example, the Internet, a wired or wireless intranet, wide area network and/or a cellular telephone network.

As also described herein, in some embodiments, the insurance medical liaison 1001 may be physically present in-person at the same location as the injured worker 1001, or may be contacted via a computer, a kiosk, a mobile device (such as a cell phone, PDA, smart phone, or the like), via a help/emergency box 1007 at the work site 1005 or via a communication component of equipment 1009 used at the work site 1005. In some embodiments, the insurance liaison 1001 may be located at the insurance company or at a third party insurance liaison vendor 1004 location, which communicates with the insurance company 1001 and the network 1002 and/or the individual locations 1005-1030. In some embodiments, a help-emergency box 1007 and/or the equipment 1009 may be "intelligent" in that it may detect the injury or the possibility thereof (e.g., via one or more sensors which may be components thereof) and/or may automatically initiate contact with the insurance medical liaison 1001 (e.g., via a telephone or cellular telephone network). In some embodiments, the equipment 1009 (which may be stationary or portable) may have caused or contributed to the injury. The equipment 1009 may include, for example, machines used for drilling, sawing, turning, welding, planing, molding, sintering, extruding, heating, cooling, vibrating, nailing, copying, cutting, attaching, assembling, disassembling, lifting, digging, moving, transporting (including vehicles and construction equipment), crushing, or any other equipment or devices used at a work site, factory or office, having the necessary sensing and/or analysis devices, computers and/or software to perform the functions described herein.

As has been described herein, many benefits may be realized by practicing the embodiments described herein. For example, customer service-oriented benefits may be realized, such as alleviating the injured worker's concerns and confusion about a WC claim process and the particular benefits the injured worker may, or is likely to, obtain. Goodwill towards the insurance provider may also be realized. There are also significant financial benefits by providing a insurance medical liaison affiliated with the insurance provider, who is distinct from the treating medical professional who examines the injured worker (or other staff of the clinic), to interact with an injured worker at the site of an injury or when the injured worker first reports to a medical care facility for an evaluation of the injury. For example, costs per claim may be reduced by (i) reducing lost time days, (ii) allowing the injured worker to return to work faster (e.g., based on modified duties worked out between the insurance medical liaison (e.g., while in consultation with the treating medical professional) and the employer), (iii) providing the injured worker the in-network pharmacies, specialists, referrals and medical treatments and (iv) reducing litigation costs due to any misunderstandings, unnecessary out-of-pocket costs and/or misinformation that may be perpetuated if the reporting of a claim is delayed.

Further, while specific embodiments have been described herein, the scope of the invention should not be limited to the explicitly described embodiments. Various modifications and inferred embodiments are also within the scope of the invention. For example, in some embodiments, the employer (or the insured) may receive a card or letter or electronic communication providing the address of the nearest participating medical clinic(s) in the area where an insurance medical liaison is present, and/or a phone number and/or web site address to reach the insurance medical liaison (or concierge or facilitator). In some embodiments, there may also be smart phone or internet applications that allow the injured worker to find the nearest participating clinic. Further, in some embodiments, if the injured worker goes to a non-participating medical clinic, hospital or other medical treatment facility, the injured worker may communicate with the insurance medical liaison prior to and/or after being treated, using any of the technologies described herein.

While many embodiments described in the present disclosure have been described as being used with regard to an injured worker for a workers compensation injury claim, it should be understood that the disclosure herein may be used with other first party or third party claimants for other types of property and/or casualty injury related claims. For example, for a first party auto claimant, if an insured driver, or family member thereof (collectively, "injured person"), is injured in an auto accident that is covered by his/her auto insurance, the injured person may go to a participating medical clinic (or other location as described herein) and interact with the insurance medical liaison (as described herein) to facilitate reporting of the auto injury claim to the insurance company. This may help accelerate claim processing and/or payment (e.g., when the injured person requires treatment before the auto claim has been reported to, or reviewed, assessed or approved by, the insurance company, or in other situations) and/or may help provide other medical injury assessment and/or treatment providers, facilities, assistance and/or options for the injured person (e.g., the liaison may provide information to the injured person regarding a nearby hospital, clinic, health care or therapy provider, or provide other assistance). The disclosure also applies to any other first party injury-related property/casualty claimant. Further, this disclosure applies to any third party injury-related property/casualty claimant, such as a third party liability claimant (e.g., injured person covered by another's business or property liability insurance), a third party auto claimant (e.g., injured person covered by another person's auto insurance), or any other third party injury-related property/casualty claimant. In that case, the injured person would be the third party claimant.

G. Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:
1. A method of operating a workers compensation insurance claim management system, comprising:
receiving, in a claim reporting system residing on a computing device and operable to facilitate the reporting of workers compensation insurance claims for an injured worker, information related to a report of a workers compensation claim, the information being provided by an insurance medical liaison located at a location at which the injured worker's injury has been evaluated, the information being indicative of an evaluation, by the insurance medical liaison, of at least one of the work-related injury and the injured worker; and creating a new record in the claim reporting system for the workers compensation claim based at least in part on the information received from the insurance medical liaison.

2. The method of claim 1, further comprising:
receiving the information indicative of the evaluation at substantially a time at which the report of the claim is received.

3. The method of claim 1, wherein the information indicative of the evaluation comprises at least one observation, made by the insurance medical liaison, about at least one of a part of the injured worker's body claimed to be injured, a demeanor, a mental state, and an anxiety level of the injured worker while at the location.

4. The method of claim 1, wherein the information indicative of the evaluation comprises at least one answer provided by the injured worker during an interview of the injured worker conducted by the insurance medical liaison at the location.

5. The method of claim 1, wherein the information indicative of the evaluation comprises an indication of whether the injured worker has retained an attorney.

6. The method of claim 1, wherein the information indicative of the evaluation comprises an indication of at least one of a compensability and a legitimacy of the claim.

7. The method of claim 1, wherein the information indicative of the evaluation comprises an indication of at least one recommendation provided to the injured worker by a treating medical professional prior to the injured worker leaving the location.

8. The method of claim 7, wherein the at least one recommendation comprises a recommendation for at least one of a treatment regimen, a physician referral, a medication, a therapist referral, a therapy, a prescription, work restrictions, and work release.

9. The method of claim 1, further comprising:
receiving from the insurance medical liaison a description of a conversation initiated by the insurance medical liaison with an employer of the injured worker while the injured worker is at the location.

10. The method of claim 9, wherein the description of the conversation includes a description of at least one modified duty the employer agreed the injured worker may perform while injured and full duty.

11. The method of claim 1, further comprising storing, in the record, the information.

12. The method of claim 1, further comprising determining whether a claim for the work-related injury has previously been reported by at least one of an employer of the injured worker and the injured worker.

13. The method of claim 12, wherein the determining is performed upon receiving the information relating to the workers compensation claim from the insurance medical liaison and further comprising:
when the work-related injury has previously been reported by the employer, storing the information provided by the insurance medical liaison in a record previously established in the claim reporting system for the work-related injury.

14. The method of claim 12, wherein the determining is performed upon receiving the information relating to the workers compensation claim from the insurance medical liaison and further comprising when the work-related injury has not previously been reported by the employer, establishing a record in the claim reporting system for the work-related injury based on the information provided by the insurance medical liaison and storing, in the record, the information.

15. The method of claim 12, wherein the determining is performed after the record has been established based upon the information provided by the insurance medical liaison and further comprising combining the information provided by the insurance medical liaison and stored in the record with information provided by at least one of the employer and the injured worker at a time the claim was previously reported by the at least one of the employer and the injured worker.

16. The method of claim 1, wherein the location is at least one of a medical facility, a work site, a retail facility, and a vehicle.

17. The method of claim 1, wherein the insurance medical liaison comprises at least one of a live nurse and a claim representative.

18. The method of claim 1, wherein the insurance medical liaison comprises a virtual representation of a person.

19. The method of claim 1, wherein the insurance medical liaison comprises software stored on a device located at the location.

20. The method of claim 19, wherein the software is operable to receive information from at least one sensor located at the location, the sensor operable to determine at least one portion of the information.

21. The method of claim 20, wherein the at least one portion of the information comprises at least one of a condition of the injured worker and a condition of an apparatus being utilized by the injured worker.

22. An apparatus comprising:
a processor; and
a computer-readable memory in communication with the processor, the computer-readable memory storing instructions that when executed by the processor result in:
receiving, in a claim reporting system residing on a computing device and operable to facilitate the reporting of workers compensation insurance claims for an injured worker, information related to a report of a workers compensation claim, the information being provided by an insurance medical liaison located at a location at which the injured worker's injury has been evaluated,
the receiving information being indicative of an evaluation, by the insurance medical liaison of at least one of the work-related injury and the injured worker; and
creating a new record in the claim reporting system for the workers compensation claim based at least in part on the information received from the insurance medical liaison.

23. The apparatus of claim 22, wherein the information indicative of the evaluation comprises at least one observation, made by the insurance medical liaison, about at least one of (i) a part of the injured worker's body claimed to be injured, (ii) a demeanor of the injured worker while at the location, (iii) a mental state of the injured worker while at the location, and (iv) an anxiety level of the injured worker while at the location.

24. The apparatus of claim 22, wherein the information indicative of the evaluation comprises at least one answer provided by the injured worker during an interview of the injured worker conducted by the insurance medical liaison at the location.

25. The apparatus of claim 22, wherein the information indicative of the evaluation comprises an indication of at least one recommendation provided to the injured worker by a treating medical professional prior to the injured worker leaving the location.

26. The apparatus of claim 22, wherein the at least one recommendation comprises a recommendation for at least one of a treatment regimen, a physician referral, a medication, a therapist referral, a therapy, a prescription, work restrictions, and work release.

27. The apparatus of claim 22, wherein the instructions when executed by the processor further result in receiving from the insurance medical liaison a description of a conversation initiated by the insurance medical liaison with an employer of the injured worker while the injured worker is at the location.

28. The apparatus of claim 22, wherein the location is at least one of a medical facility, a work site, a retail facility, and a vehicle.

29. The apparatus of claim 22, wherein the insurance medical liaison comprises at least one of a live nurse and a claim representative.

30. The apparatus of claim 22, wherein the insurance medical liaison comprises a virtual representation of a person.

31. The apparatus of claim 22, wherein the insurance medical liaison comprises software stored on a device located at the location.

32. The apparatus of claim 31, wherein the software is operable to receive information from at least one sensor located at the location, the sensor operable to determine at least one portion of the information.

\* \* \* \* \*